(12) United States Patent
Vityaz

(10) Patent No.: US 11,237,835 B2
(45) Date of Patent: Feb. 1, 2022

(54) SYSTEM AND METHOD FOR PROCESSING DATA OF ANY EXTERNAL SERVICES THROUGH API CONTROLLED UNIVERSAL COMPUTING ELEMENTS

(71) Applicant: Middlware, Inc., Wilmington, DE (US)

(72) Inventor: Oleksandr Vityaz, Dnipropetrovsk (UA)

(73) Assignee: Middleware, Inc., Wilmington, DE (US)

( * ) Notice: Subject to any disclaimer, the term of this patent is extended or adjusted under 35 U.S.C. 154(b) by 0 days.

(21) Appl. No.: 16/252,075

(22) Filed: Jan. 18, 2019

(65) Prior Publication Data

US 2019/0250922 A1    Aug. 15, 2019

Related U.S. Application Data

(63) Continuation-in-part of application No. 15/268,802, filed on Sep. 19, 2016, now abandoned, and a
(Continued)

(51) Int. Cl.
| | | |
|---|---|---|
| *G06F 9/38* | (2018.01) | |
| *G06F 9/32* | (2018.01) | |
| *B25J 9/16* | (2006.01) | |

(52) U.S. Cl.
CPC ............ *G06F 9/3855* (2013.01); *B25J 9/163* (2013.01); *B25J 9/1661* (2013.01); *B25J 9/1664* (2013.01); *G06F 9/321* (2013.01)

(58) Field of Classification Search
CPC ...... G06F 9/465; G06F 9/5083; G06F 9/5088; G06F 11/0709; G06F 2009/4557;
(Continued)

(56) References Cited

U.S. PATENT DOCUMENTS 5,999,986 A * 12/1999 McCauley, III ........ G06F 9/542
719/310
6,718,533 B1 * 4/2004 Schneider ................ G06F 8/10
700/97
(Continued)

OTHER PUBLICATIONS

Albus, James S. "An intelligent systems architecture for manufacturing." Proceedings of the International Conference on Intelligent Systems: A Semiotic Perspective. 1996. (Year: 1996).*
(Continued)

*Primary Examiner* — Doon Y Chow
*Assistant Examiner* — Joanne G Macasiano
(74) *Attorney, Agent, or Firm* — Bekiares Eliezer LLP

(57) ABSTRACT

A system and method for processing data using the universal computing element, which is a computing node that could be integrated with any external services of different business domains via an application programming interface (API), is disclosed. Data and processes are bound using universal computing elements and computing modes that use UCE's, and thus provided as finite-state automata with explicit selection of states in real-time operation, thereby facilitating construction of finite-state automata (i.e., processes) to users who are not programmers. Software, computer program, source/object/assembly code, firmware or other reconfigurable logic or signal processing instructions of the present invention include at least one UCE. Advantageously, data processing is organized to reduce impact of inefficient conventional data usage, particularly via data transfer processed innovatively into state format and usage of automata-based programming for data processing.

22 Claims, 34 Drawing Sheets

Related U.S. Application Data continuation-in-part of application No. 15/077,626, filed on Mar. 22, 2016, now abandoned.

(60) Provisional application No. 62/221,124, filed on Sep. 21, 2015, provisional application No. 62/137,079, filed on Mar. 23, 2015.

(58) Field of Classification Search
CPC .... G06F 8/00–78; G06F 9/3855; G06F 9/321; B25J 9/163; B25J 9/1661; B25J 9/1664
See application file for complete search history.

(56) References Cited

U.S. PATENT DOCUMENTS

| | | | | |
|---|---|---|---|---|
| 7,051,330 | B1* | 5/2006 | Kaler | G06F 9/4843 709/203 |
| 2003/0055938 | A1* | 3/2003 | Barzilai | H04L 47/562 709/223 |
| 2009/0182610 | A1* | 7/2009 | Palanisamy | G06Q 10/10 707/600 |
| 2012/0227044 | A1* | 9/2012 | Arumugham | G06Q 10/06 718/100 |
| 2013/0091506 | A1* | 4/2013 | Boris | G06F 9/5083 718/103 |
| 2013/0138593 | A1 | 5/2013 | Miller et al. | |
| 2013/0304903 | A1 | 11/2013 | Mick et al. | |
| 2014/0047272 | A1* | 2/2014 | Breternitz | G06F 11/3495 714/32 |
| 2015/0199274 | A1* | 7/2015 | Klein | G06F 12/0831 711/146 |
| 2017/0048123 | A1* | 2/2017 | Sun | G06F 9/5083 |
| 2018/0069751 | A1 | 3/2018 | Guo et al. | |
| 2018/0288506 | A1 | 10/2018 | Muller et al. | |
| 2018/0343217 | A1 | 11/2018 | Sedan et al. | |
| 2019/0007489 | A1 | 1/2019 | Vityaz | |
| 2019/0155741 | A1 | 5/2019 | Linke | |
| 2019/0245918 | A1 | 8/2019 | Xu et al. | |

OTHER PUBLICATIONS

Adiprawita, Widyawardana, and Adrianto Ravi Ibrahim. "Service oriented architecture in robotic as a platform for cloud robotic (Case study: human gesture based teleoperation for upper part of humanoid robot)." 2012 International Conference on Cloud Computing and Social Networking (ICCCSN). IEEE, 2012. (Year: 2012).*

Egunov, Vitaly Alekseevich, Semyon Igorevich Kimosenko, and Andrey Evgenevich Andreev. "Robotic Complex Central Processing Node Performance Requirements Assessment." World Applied Sciences Journal (WASJ) 24.24 (2013): 37. (Year: 2013).*

U.S. Non-Final Office Action dated May 26, 2020 cited in U.S. Appl. No. 16/027,926, 22 pgs.

U.S. Final Office Action dated Jul. 20, 2020 cited in U.S. Appl. No. 16/072,926, 24 pgs.

U.S. Non-Final Office Action dated Sep. 21, 2020 cited in U.S. Appl. No. 16/072,926, 21 pgs.

U.S. Final Office Action dated Jan. 19, 2021 cited in U.S. Appl. No. 16/072,926, 21 pgs.

* cited by examiner

SYSTEM AND METHOD FOR PROCESSING DATA OF ANY EXTERNAL SERVICES THROUGH API CONTROLLED UNIVERSAL COMPUTING ELEMENTS

CROSS-REFERENCE TO RELATED APPLICATION

This non-provisional patent application is a continuation-in-part application under 35 U.S.C. § 120 of U.S. patent application Ser. No. 15/077,626, entitled "Universal Computing Element (UCE) and the Mode of Computing with the Use of UCE" filed on Mar. 22, 2016, and U.S. application Ser. No. 15/268,802 for "Method of Binding Data and Processes with the Use of Universal Computing Elements", filed on Sep. 19, 2016, which claims the benefit under 35 U.S.C. § 119(e) of U.S. Provisional Patent Application No. 62/221,124, entitled for "Method of Binding Data and Processes with the Use of Universal Computing Elements", filed on Sep. 21, 2015.

BACKGROUND OF THE INVENTION

A. Technical Field

The present invention generally relates to computer-implemented systems and methods for processing data using universal computing elements, and more specifically relates to a system and method for processing data using the universal computing element, which is a computing node that could be integrated with any external services of different business domains via an application programming interface (API).

B. Description of Related Art

Conventional electronic databases provide limited functionality, especially as advanced network access to data increasingly requires higher speed storage and access, as well as more complex data formats. For example, there is increasing need for providing higher intensity of data flow, instant availability of data storage, support of incompatible data formats, as well as various changes in data processing. Due to growing complexity of data processing, data processing becomes more time-consuming, thus complicating the process of making changes thereto, and requires higher professional skills of developers to build and modify more complex data systems that more flexibly allow organized online interaction between large number of various system applications.

Further, Conventional computer-implemented design systems provide software tools which often encounter practical problems in software development, for example, pertaining to customer problems (e.g., too long, expensive, inflexibility, high cost of updates, dependence on the developer, succession/inheritance, etc.,) and developer problems (e.g., modern programming with implicit selection of status resulting in inherent technical problems, too long, succession/inheritance, etc.). Therefore, there is a need for a system and method to address such conventional problems to improve computer programming and software development. Further, there is a need to provide a system and method for processing data using a universal computing element. Further, there is a need to provide a system and method for processing data using a computing node that could be integrated with any external services of different business domains via an application programming interface (API).

SUMMARY OF THE INVENTION

The present invention provides a system and method for processing data using the universal computing element, which is a computing node that could be integrated with any external services of different business domains via an application programming interface (API). The present invention further provides a system and method for processing data flow without need for SDK type developer kits or post facto coding.

The present invention further provides a system and method to enable computer programming and software development using Universal Computing Element (UCE) and various computing modes that functionally and/or structurally use of one or more UCE. The system and method further provide a system and method to automate data processing flow as a set of system states, particularly whereby data and processes are bound using universal computing elements, as finite-state automata with explicit selection of states in real-time operation, thus facilitating construction of finite-state automata/processes to users. For example, data flow is processed as a set of system states significant for a given process purpose. Preferably for such purpose, data and processes are provided as finite-state automata automatically with explicit selection of states in real-time operation, thereby enabling automata-based construction of finite-state automata or processes, for example, for users who are not programmers. Advantageously, data processing is organized to reduce impact of inefficient conventional data usage, particularly via data transfer processed innovatively into state format and usage of automata-based programming for data processing.

The system comprises an automata-based programming environment and a processor. The automata-based programming environment is configured to receive configuration of a set of universal computing elements into a data process comprising the set of universal computing elements. The universal computing elements is a computing node that could be integrated with any external services of different business domains via an application programming interface (API). In an embodiment, each universal computing element within the set of universal computing elements respectively comprises a queue of objects, a counter, an object function and a counter function. The queue of objects is hosted on a computing device, wherein each object within the queue of objects comprises one or more data models, wherein the one or more data models comprise motion values for execution by a robot and wherein the motion values are vectors comprising directions and magnitudes. The counter is configured to dynamically represent a status of objects within the queue of objects. The object function is configured to receive the one or more data models comprised by an object within the queue of objects and execute a function using the one or more data models. The counter function is configured to manage execution of the object function based on the counter. The processor communicatively coupled to the external source is configured to host the data process, receive data from an external source; and process the data according to the data process comprising the set of universal computing elements.

In one embodiment, the present invention provides a method for processing data using universal computing elements. The method comprises a step of: providing an automata-based programming environment for the configuration of universal computing elements. Each universal computing element within the set of universal computing elements respectively comprises a queue of objects, a counter, an object function and a counter function. The queue of objects is hosted on a computing device, wherein each object within the queue of objects comprises one or more data models, wherein the one or more data models comprise motion values for execution by a robot and wherein the motion values are vectors comprising directions and magnitudes. The counter is configured to dynamically represent a status of objects within the queue of objects. The object function is configured to receive the one or more data models comprised by an object within the queue of objects and execute a function using the one or more data models. The counter function is configured to manage execution of the object function based on the counter.

The method further comprises a step of: receiving, through the automata-based programming environment, configuration of a set of universal computing elements into a data process comprising the set of universal computing elements. The method further comprises a step of: hosting the data process on a processor. The method further comprises a step of: receiving data at the processor from an external source, wherein the receiving further comprises a step of determining a status of the objects within the queue of objects by referencing the counter, based on the status of the objects within the queue of objects, executing the counter function, and based on an output of the counter function, executing the object function on an object within the queue of objects using the one or more data models. The method further comprises a step of: processing the data according to the data process comprising the set of universal computing elements.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for processing data using universal computing elements. The universal computing element (UCE) is a computing node that could be integrated with any external services of different business domains via an application programming interface (API).

Figure 1:
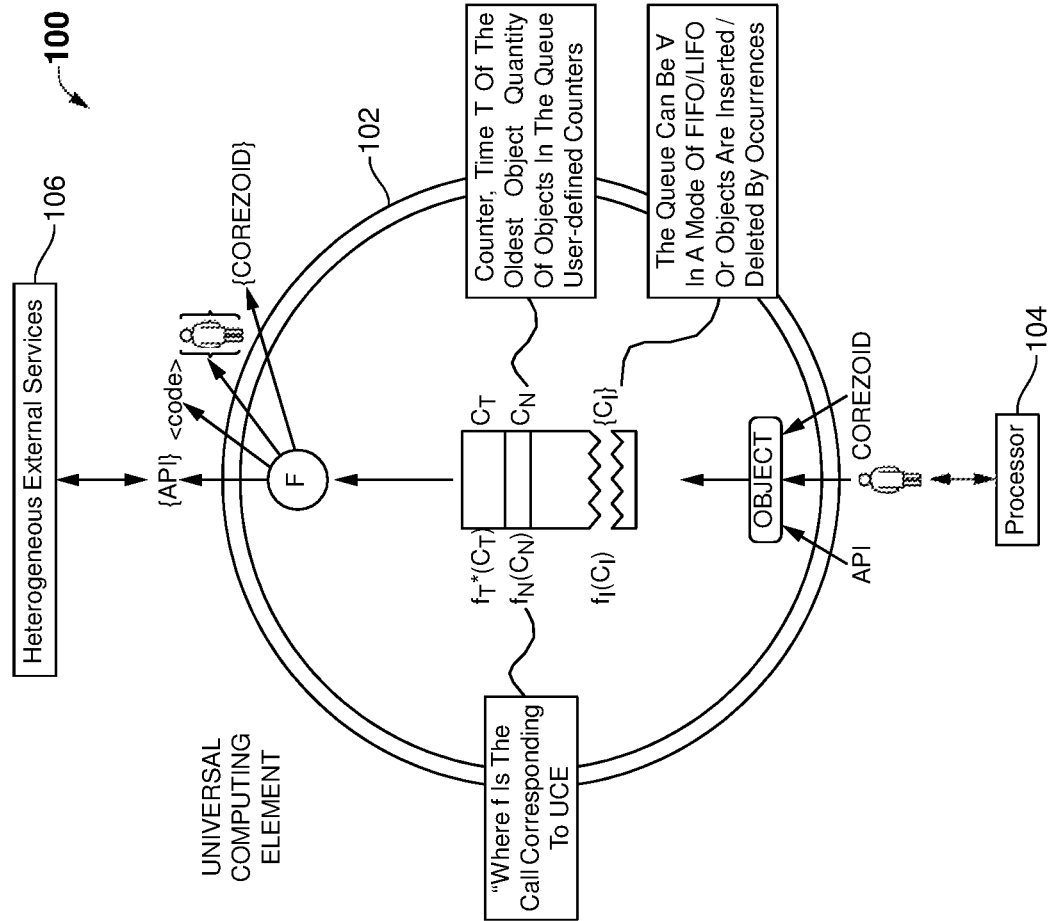
FIG. 1 exemplarily illustrates an environment implemented according to one or more aspect of the present invention.

Referring to FIG. 1, the environment 100 comprises an automata-based programming environment 102 and a processor 104. The automata-based programming environment 102 is configured to receive configuration of a set of universal computing elements into a data process comprising the set of universal computing elements. In an embodiment, each universal computing element within the set of universal computing elements respectively comprises a queue of objects, a counter, an object function and a counter function. The queue of objects is hosted on a computing device, wherein each object within the queue of objects comprises one or more data models, wherein the one or more data models comprise motion values for execution by a robot and wherein the motion values are vectors comprising directions and magnitudes. The counter is configured to dynamically represent a status of objects within the queue of objects. The object function is configured to receive the one or more data models comprised by an object within the queue of objects and execute a function using the one or more data models. The counter function is configured to manage execution of the object function based on the counter. The processor 104 communicatively coupled to the external source is configured to host the data process, receive data from a heterogeneous external source 106; and process the data according to the data process comprising the set of universal computing elements. The universal computing element is a computing node that could be used with any external services via API. Advantageously, the present invention enables to create business process without coding/programming knowledge and could be used by business analytics. For example, the present invention enables to create business process without need for SDK type developer kits or post facto coding.

The system is configured to receive data from any database through an API, and also send data back through APIs to any databases. In one embodiment, the system allows a user to push data to universal computing element through API, where the user could describe the logic of the whole process, orchestrating data from dozens or hundreds of APIs. Once APIs of various systems are in place, business analysts and managers could hook them up and combine them in any way that they see fit and does not need to know programming languages or use up the bandwidth of valuable (expensive) programmers. A business process can be created, modified, and shared, making this method easy, light, and fast. In one embodiment, the system is configured to build processes simply by combining logical blocks using 'drag & drop' feature.

Figure 2:
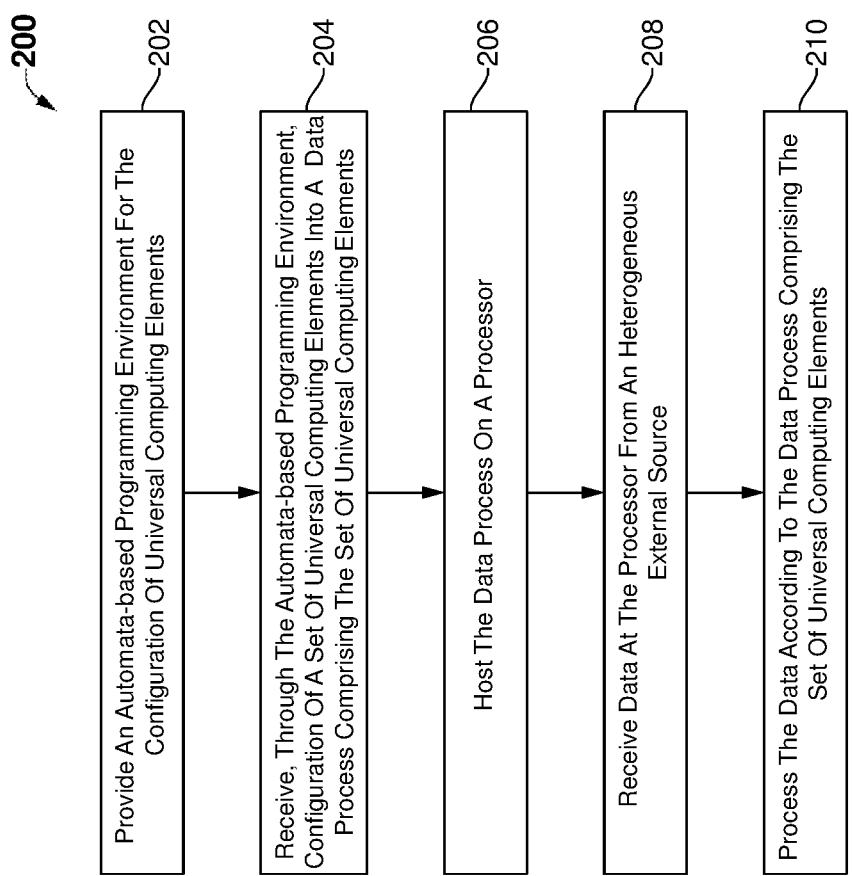
FIG. 2 exemplarily illustrates a method for processing data using universal computing elements, according to one or more aspect of the present invention.

Referring to FIG. 2, in one embodiment, the present invention provides a method 200 for processing data using universal computing elements. The method 200 comprises a step 202 of: providing an automata-based programming environment for the configuration of universal computing elements. Each universal computing element within the set of universal computing elements respectively comprises a queue of objects, a counter, an object function and a counter function. The queue of objects is hosted on a computing device, wherein each object within the queue of objects comprises one or more data models, wherein the one or more data models comprise motion values for execution by a robot and wherein the motion values are vectors comprising directions and magnitudes. The counter is configured to dynamically represent a status of objects within the queue of objects. The object function is configured to receive the one or more data models comprised by an object within the queue of objects and execute a function using the one or more data models. The counter function is configured to manage execution of the object function based on the counter.

The method 200 further comprises a step 204 of: receiving, through the automata-based programming environment, configuration of a set of universal computing elements into a data process comprising the set of universal computing elements. The method 200 further comprises a step 206 of: hosting the data process on a processor. The method 200 further comprises a step 208 of: receiving data at the processor from an external source, wherein the receiving further comprises a step of determining a status of the objects within the queue of objects by referencing the counter, based on the status of the objects within the queue of objects, executing the counter function, and based on an output of the counter function, executing the object function on an object within the queue of objects using the one or more data models. The method 200 further comprises a step 210 of: processing the data according to the data process comprising the set of universal computing elements.

In one embodiment, the system for processing data using universal computing elements is detailly explained as follows. The invention automates data processing flow as a set of system states, particularly whereby data and processes are bound using universal computing elements, as finite-state automata with explicit selection of states in real-time operation, thus facilitating construction of finite-state automata/processes to users. For example, data flow is processed as a set of system states significant for a given process purpose. Preferably for such purpose, data and processes are provided as finite-state automata automatically with explicit selection of states in real-time operation, thereby enabling automata-based construction of finite-state automata or processes, for example, for users who are not programmers. Generally, it is contemplated herein that computer-automated software method and/or hardware system binds and constructs data and process electronically using universal computing element, whereby data and process associated with a first data processing flow are bound electronically, wherein such data and process are bound using one universal computing element(s) corresponding to system state(s) significant to the data processing flow. Finite-state automata or process may be constructed automatically to facilitate real-time operation of the data processing flow according to such universal computing element(s) via explicit selection of such system state(s). Advantageously, data processing is organized to reduce impact of inefficient conventional data usage, particularly via data transfer processed innovatively into state format and usage of automata-based programming for data processing.

In accordance with one embodiment of the present invention, data is processed per following automated steps:
(1) company data (both found in databases and formed in the course of the company activity without storing as the records in databases) is transformed automatically into finite set of states with the use of the Universal Computing Element (UCE);

Alternatively, in one embodiment, one or more list of states that is significant for data processing may initially be determined analytically, such that company data may then be transformed automatically into finite set of states with the use of UCE. A sample embodiment automates taxi driver processing, using one or more driver states to facilitate determining whether to send order to certain driver; although such driver may have various insignificant states (e.g., male/female, married/single, etc.) For instance, significant states comprise that driver: (a) is waiting for an order, (b) is executing the order, and (c) is offline. Preferably, automated analysis initially determines list of significant states, then proceeds automatically to build one or more algorithm. Thus, data may be transformed automatically into finite set of states, e.g., for advanced usage. And determination of list of states significant for data processing may initially be determined either analytically or automatically.

(2) in the course of data processing in one or more Universal Computing Elements, source data is not sent; instead, data models required for the processes are sent automatically, and whenever necessary confidential information is replaced automatically by its identifiers;
(3) automata-based programming by adding of new Universal Computing Elements (automata) is used automatically for data processing; and
(4) data is exchanged automatically between units "inside" the diagram of the process and between external sources of data, including other units "external" with regard to current process diagram of the units; therefore, flexible and easy integration is provided.

Figure 4:
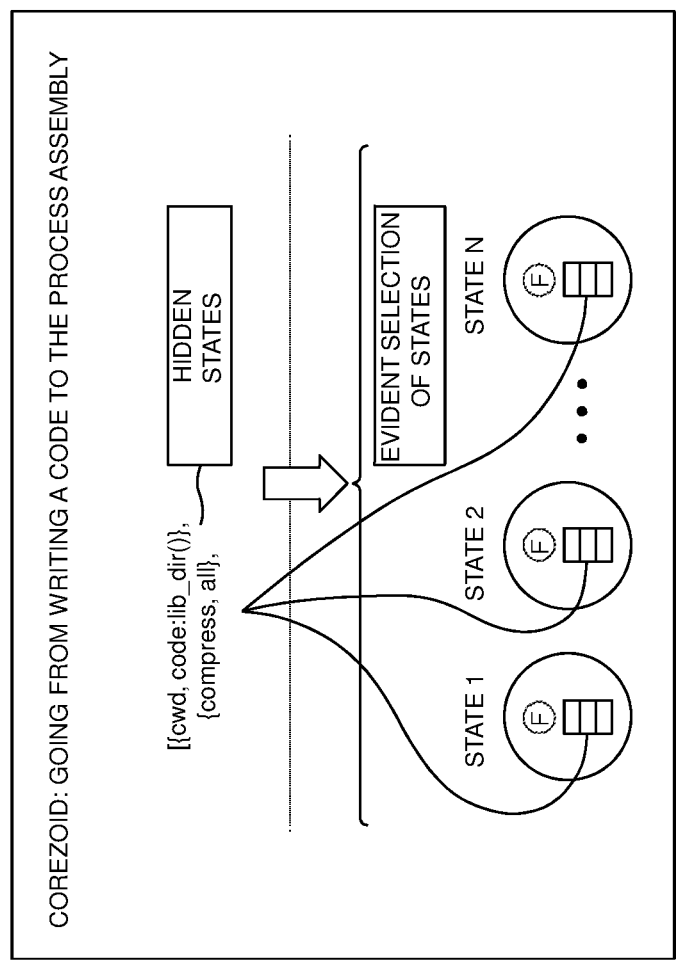
FIG. 4 illustrates process assembly of Universal Computing Element (UCE or COREZOID) schematically showing steps to transform data into information about states using system assembled with UCE/COREZOID, according to one or more aspect of the present invention.

Thus, users are automatically provided processing environment wherein data converted into more convenient form, whereby such environment provides for processing more efficiently in terms of finite-state automata. Preferably, users cannot process data not in the mode of automata, such that data transferred in this environment is automatically converted into the set of finite states always for generating resulting processes. Furthermore, processes running in this environment may generate new states also in such automata mode. Advantageously, data processing system configured automatically according to such automata-based programming environment provides opportunities for flexible expansion, and constructing stable controllable links to integrate with other network computing systems. In accordance with one or more aspect of the present invention, one or more Universal Computing Element (UCE or COREZOID) is provided for automatic configuration, as shown schematically in FIG. 1, with one or more of the following structural functions, programmable attributes, or characteristic definitions or nomenclature:

queue—queues of objects in the unit;
semaphores—system and user semaphores; when certain values are reached, semaphore triggers parallel process of escalation;
counters—system and user counters; counter may show the value only, without action (this is how counters differ from semaphores);
system semaphore T—specified time of the object staying in the unit;
system semaphore N—specified number of objects that can be queued in the unit;
other data models—which can be specified for objects queued in the unit;
functions—actions to be performed on the object from the queue in the unit; also, functions can be in the form of API, software code, other conveyor etc.; when specified values of semaphores and/or functions are violated (exceeded), escalation is triggered (can be arranged with the use of conveyor as well) accepting the objects for processing;
f—call of relevant function, unit(i);
F—for each unit there is a corresponding function which can be realized through operator, API, code, other unit;
$C_m$—counter, time T of the oldest object in queue
$C_n$—number of objects in queue
$\{C_i\}$—custom counters
object—set of data models characterizing the object; according to certain rules, data on the object is processed in the unit—function is applied to the object;
functions—actions to be performed on the object from queue in the unit; functions can be in the form of API, software code, other process etc.;
logic—tools for controlling logic in the unit; system and use logics;
system logic T—specified time of the object staying in the unit;
system logic N—specified number of objects that can be queued in the unit;

For optimization purposes in large systems, counters may be run or accessed on separate servers in a network. In one embodiment of the present invention, CALLBACK logic is used as basic logic element in the Universal Computing Element. For example, CALLBACK may be used for asynchronous interaction with external API and other processes, such as request when gets to the unit with CALLBACK "hands up" and waits for update from external system of other process. Owing to CALLBACK logic, processes created with the use of the Universal Computing Elements can operate in the mode of finite-state automata, as shown in FIG. 4.

Regarding operation of the Universal Computing Element, generally such unit structurally in hardware, firmware, and/or software embodied using one or more processor, computer, controller, etc., comprises one or more queues, one or more counters, one or more queues, one or more functions from counters (e.g., semaphores), as well as functions applied to queued objects. Initially, information about one or more object may be transferred automatically to the unit queue input (i.e., object identifier—$O_i$). Such queue may be configured and/or described by standard semaphores and/or counters, e.g., semaphores of time, quantity, etc. Moreover, according to predetermined or modified rules and/or data models, data on one or more object is processed in the UCE unit, i.e., the function is applied to such object. Application of function to such object preferably has defined limitations on time and quantity. Also, such functions can be realized through API, code, conveyor, operator, etc. After successful processing of object data, the unit delivers results for further processing to other units, or processing is completed. In case of deviation from normal operation of the unit (e.g., processing time exceeded, more objects in queue which are waiting for processing, etc.), the unit triggers escalation (e.g., escalation algorithm may deploy additional units). Escalation data models and conditions can be extended based on needs of one or more algorithm.

In particular one embodiment of present invention includes one or more operational method steps for data transformation automatically, as follows:

Step 1. Determination of list of system states significant for data processing;

Step 2. Determination of data models used for designation of necessary states;

Step 3. Development of process algorithm for data processing;

Step 4. Designing of Universal Computing Element layout which provides for implementation of the process algorithm;

Step 5. Setting of data models sent to system and between Universal Computing Elements within the diagram, when units with CALLBACK logic are included into parts of process where system should stop waiting for next event significant for the process. Upon occurrence of one of significant events, system may continue processing of information according to basic diagram to next UCE with CALLBACK logic or final UCE according to the diagram, e.g., go to the next state. If the event significant for the system is expiry of specified waiting time, it is possible to use (i.e., instead of CALLBACK logic) the system semaphore T which turns system to next state upon occurrence of the event, i.e. expiry of specified waiting time.

Step 6. Sending flow of data to be processed to input of diagram assembled of the Universal Computing Elements.

Step 7. Presence of created system of units with CALLBACK logic in the basic diagram leads to mode of data processing, when after each or some significant event, system goes into new significant state and stays in it for a specified time until next significant event occurs.

Step 8. Since each Universal Computing Element may process, obtain and transfer data both to internal and external (i.e., with regard to the process diagram) units, movement of the request (e.g., single set of data about the event in the system) from one unit to another according to the process algorithm and diagram may lead to changing a number of states (e.g., copying, modification, etc.) instead of one state, and initiate new processes built on the same principles.

In one embodiment regarding automated payment of invoices of individuals for services, one or more bank institution based on contracts with service providers (e.g., utility company, telecommunication company, etc.) may receive database on residents' debts for services of such provider company automatically to arrange acceptance of payments from these individuals.

Optionally, such provider bank provides individuals opportunity to find out actual amount of their debt and pay invoice issued by the company by any convenient means automatically, e.g., at the bank branch, ATM, through Internet client-bank system, smartphone application, or any other available means. However, conventional invoice payments by individuals are unreliable, for example, since individuals may need to make a request to the database on the amount of bank debt, and initiate payment knowingly; hence, individuals may forget to pay in time or permanently defer their payments altogether, and as a consequence, cash inflow to service provider is reduced significantly. Additionally, customer may routinely contact bank on other transactions, e.g., deposit, transfer receipt, loan servicing, etc., during which customer may pay invoices, i.e., if such customer considers payment then conveniently. Thus, advantageously according to one or more aspect of the present invention, automated provision of computer-implemented steps facilitates timely receipt of money by service provider, and simplifies procedure of individual invoice payment due to more convenient payment procedure, for example, by eliminating necessity to give a request to the bank of the amount of debt. Preferably, automated invoice for payment of debt waits for customer in any channel of bank service. One automated embodiment of preferred provision of computer-implemented steps follows:

Step 1. Automatically create finite-state automaton with two system states; define the significant states of the system:

(1) Wait for bank customer in whose name invoice is issued at bank point of service, e.g., 30 days, until information on amount of debt is updated;

(2) Display and wait for payment of invoice to pay for services within 10 minutes (i.e., maximum time of contact with customer in bank's service channels).

Step 2. Define various models of data:

(1) Information about the service, e.g., type;

(2) Identifier of the individual, e.g., Client_id; and (3) Amount of invoice for payment, e.g., amount.

Step 3. Develop the process algorithm for data processing, as shown in FIG. 4

Figure 5:
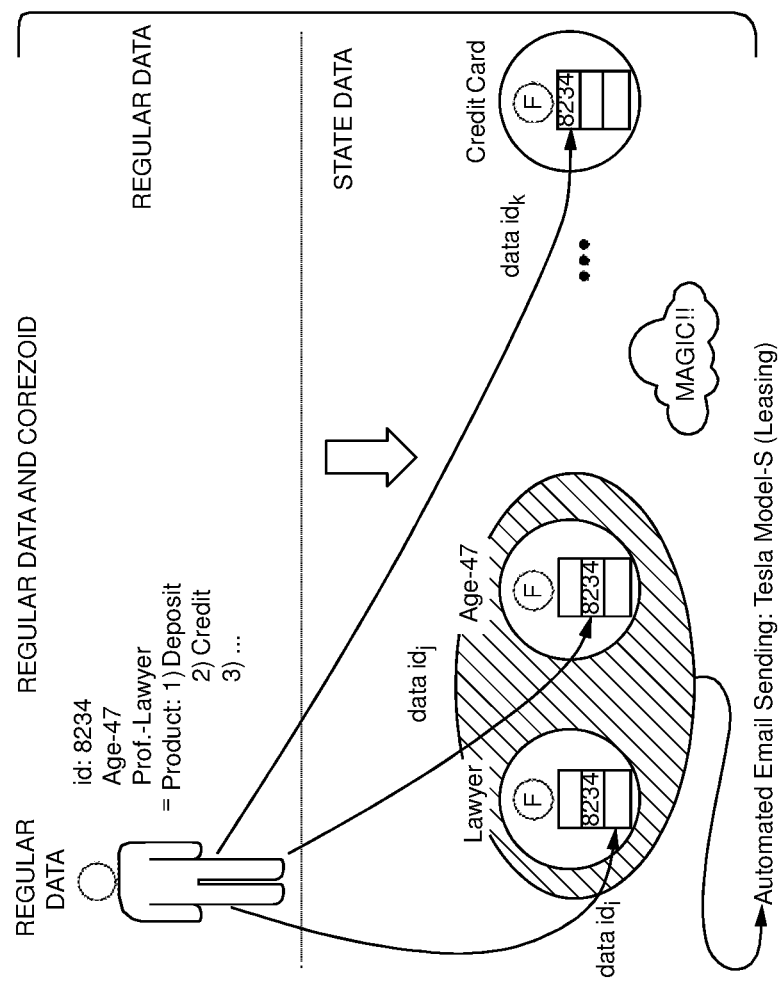
FIG. 5 illustrates binding data structures and information about states schematically, according to one or more aspect of the present invention.

Step 4. Design Universal Computing Element layout, as shown in FIG. 5. By designing UCE unit layout, for example, system configured automatically such that after receiving data of specific request (i.e., information about debt of certain individual) at any time stay in mode of waiting for significant actions of bank customer automatically in one of the following states:

(1) Waiting for bank customer in whose name invoice is issued at bank point of service, e.g., 30 days, until the information on amount of debt is updated; and (2) Waiting for pressing the "Pay" button by customer in response to bank offer to pay executed payment document, e.g., 10 minutes, maximum time of contact with customer in bank' service channel. Optionally, such system configuration is arranged using CALLBACK logic in units 4 and 6 and system semaphore in units 4, 6.

Step 5. Setting data models sent to the system and between Universal Computing Elements within the diagram. Request in the process shall be set of data described in Step 2.

Step 6. Sending data flow, e.g., table with data on amount of individual invoices sent to system input, as sequence of requests.

Step 7. Passing one or more request through diagram of the process (i.e., automaton units) results in "stopping" of data concerning each transaction in the unit corresponding to current state of the system; upon occurrence of event significant for the process (e.g., appearance of customer in service channel) system automatically goes to next state according to the algorithm and diagram of the process.

In another embodiment, data flow is transformed automatically into the automaton comprising three (i.e., instead of merely two) states, adding opportunity for customer to accept or refuse invoice payment, as follows:

Step 1. Create finite-state automaton with three system states; define significant states of the system automatically, as follows:

(1) Waiting for bank customer in whose name invoice is issued at bank point of service, e.g., 30 days, until information on amount of debt is updated;

(2) Waiting for customer decision in response to bank offer to pay invoice issued to customer, e.g., 10 minutes, average time of customer servicing at bank; and (3) Waiting for payment of invoice sent to customer after receiving customer consent to pay, e.g., 10 seconds, maximum period of invoice payment in the bank's service channels.

Figure 6:
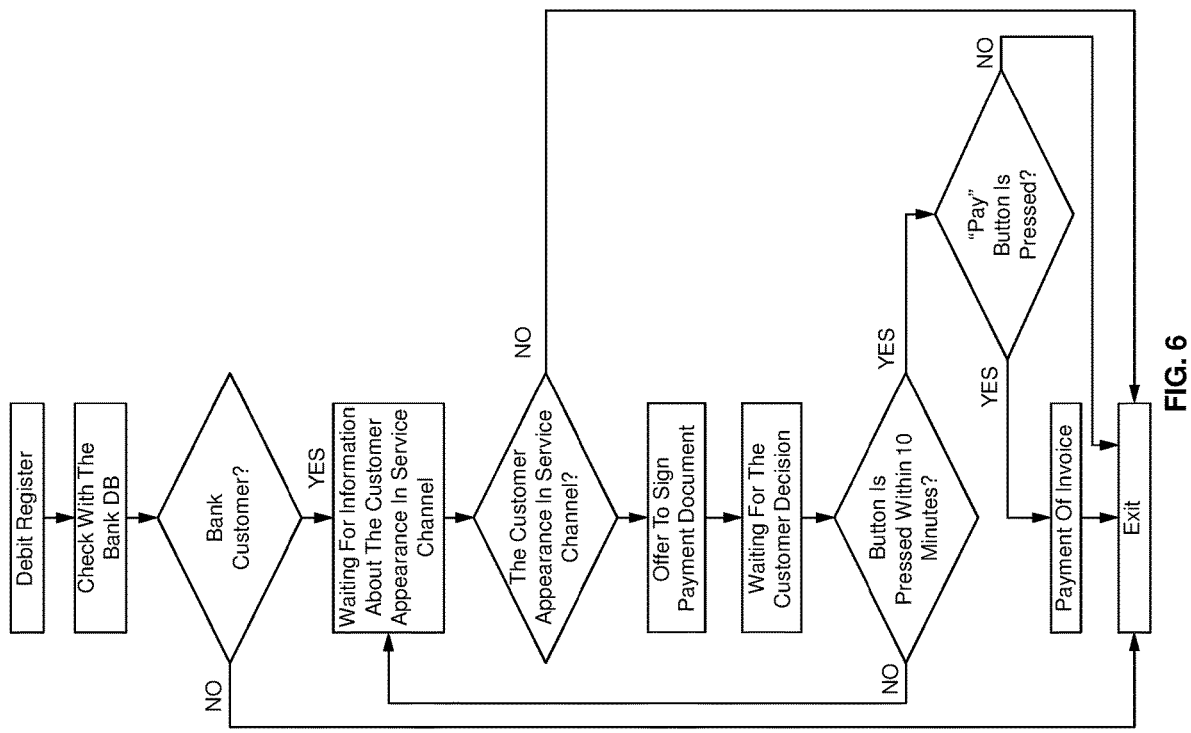
FIG. 6 illustrates invoice-payment algorithm of one method flow chart automated steps of solving task set in an example by creating finite-state automaton with two states, according to one or more aspect of the present invention.

Step 2. Define various models of data:
(1) Information about the service, e.g., type;
(2) Identified individual, e.g., Client_id; and
(3) Amount of invoice for services, e.g., amount.
Step 3. Develop the process algorithm for data processing, as shown in FIG. 6.
Step 4. Designing layout of Universal Computing Elements, as shown in FIG. 7. Regarding UCE unit layout design, it is contemplated herein generally to automate creating a system which after receiving data of request (e.g., information about debt of certain individual) at any time stay in mode of waiting for significant actions, for example, of bank customer in one of the following states:
(1) Waiting for bank customer in whose name the invoice is issued at bank point of service, e.g., 30 days, until information on amount of debt is updated;
(2) Waiting for customer decision in response to bank offer to pay invoice, e.g., 10 minutes; and
(3) Waiting for pressing "Pay" button by customer in response to bank offer to pay executed payment document, e.g., 10 seconds. Optionally, such system is arranged due to use of CALLBACK logic in units 4, 6 and 9 and system semaphores T in units 4, 6 and 9.
Step 5. Setting of data models sent to the system and between Universal Computing Elements within the diagram; request in the process may be the set of data described in Step 2.
Step 6. Sending of data flow; table with data on amount of individual invoices is sent to system input, as sequence of requests.
Step 7. Passing of one or more request through the diagram of the process (i.e., automaton units) results in "stopping" of data concerning each transaction in the UCE unit which corresponds to current state of the system; upon occurrence of event significant for the process (e.g., appearance of customer in service channel) the system automatically goes to next state according to the algorithm and diagram of the process.

Generally, in accordance with one or more aspects of the present invention, it is contemplated that one or more embodiments automate a computer-implemented system and/or method in accordance with one or more of the following structural and/or programmable limitations, featured functionality, or descriptive notes:
(1) Multi-state automaton examples show various ways of solving system task using Universal Computing Elements, which differ accordingly by data models of finite-state automaton being created.
(2) During data flow (e.g., list of debtors with indication of amount of debt) to input of the system, one or more automaton is processed automatically in one or more significant states, e.g., waiting for customer, for consent to pay, for payment, etc. (i.e., with regard to indebted customer).
(3) Construction of the system (e.g., automaton with three or two states) is carried out by constructing algorithm for data processing and subsequent implementation of the algorithm in diagram of element binding, comprising Universal Computing Element with one or more functions "active".
(4) Changing the algorithm of system operation is performed automatically according to change in structure and type of Universal Computing Element functions used.
(5) Interaction of created system with external systems is performed with use of API and/or CallBack functions (logics).
(6) Preferable system may be configured automatically in mode of waiting for information from external systems, and changes state upon receiving relevant data.
(7) Sequence of states hardly coded with the use of the algorithm and diagram automates transforming the data on states into processes which in their turn change state of the system, i.e., "States generate processes, and processes generate states".
(8) When system stays in mode of waiting for significant event, it results instantly in response of the system (i.e., instant availability of data) to such change.
(9) System constructed in this automated manner allows processing of data not compatible beyond its limits using API logic. Hence present method of data processing may enhance flexibility and complexity of systems considerably owing to possibility of combining and processing data of unlimited number of applications.
(10) The proposed method of system development substantially reduces cost of process of making changes into information systems. Changing the system (e.g., addition/removal of units, logics inclusion to/exclusion from a small set, connection/disconnection of links to external system addresses, etc.) may not require specialized programming skills.

Figure 3:
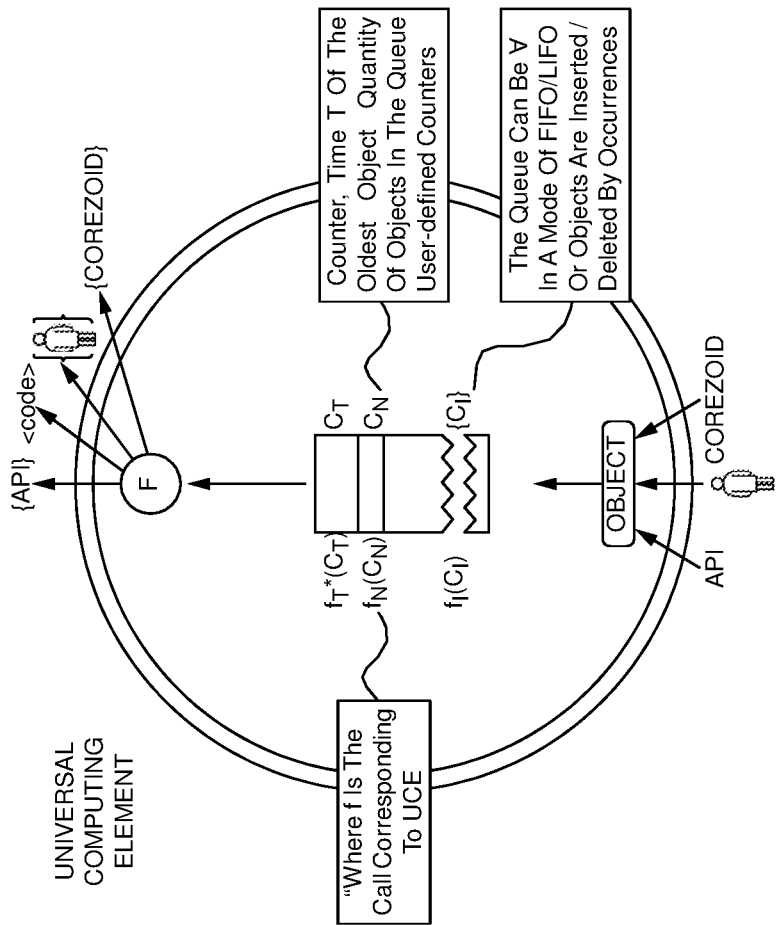
FIG. 3 illustrates Universal Computing Element (UCE or COREZOID) structure schematically, according to one or more aspect of the present invention.

FIG. 3 illustrates Universal Computing Element (UCE or COREZOID) structure schematically. FIG. 4 illustrates process assembly of Universal Computing Element (UCE or COREZOID) schematically showing steps to transform data into information about states using system assembled with UCE/COREZOID. FIG. 5 illustrates binding data structures and information about states schematically. For example, a set of customer historical data is shown to be collected electronically by a bank, and history of customer transactions is transformed automatically onto set of states significant for bank process flow, using data processing system assembled using Universal Computing Elements (UCE/COREZOID). As soon as the process, for which one state or several states are determined to be significant, appears at the bank, the system preferably changes state to next one, according to present process algorithm. FIG. 5 example shows lawyer, a man of 47 years old, having deposit and active credit card; owing to partner program between bank and Tesla car manufacturer, bank automatically makes special offer on buying the car of Tesla model-S on credit to all customers—lawyers at age of 47 years. At the time when the process of the offer sending is initiated, the system automatically determines compliance of the candidate with specified terms and creates new state in the system—"sending of Tesla model-S buying on credit" to the customer ID 8234. Situation when the promotional event started in the past, but the customer reaches the age of 47 years now, gives the same result (i.e., adding of a new state); thus changing "age" state results in change of "Tesla model-S offer" state.

Figure 7A:
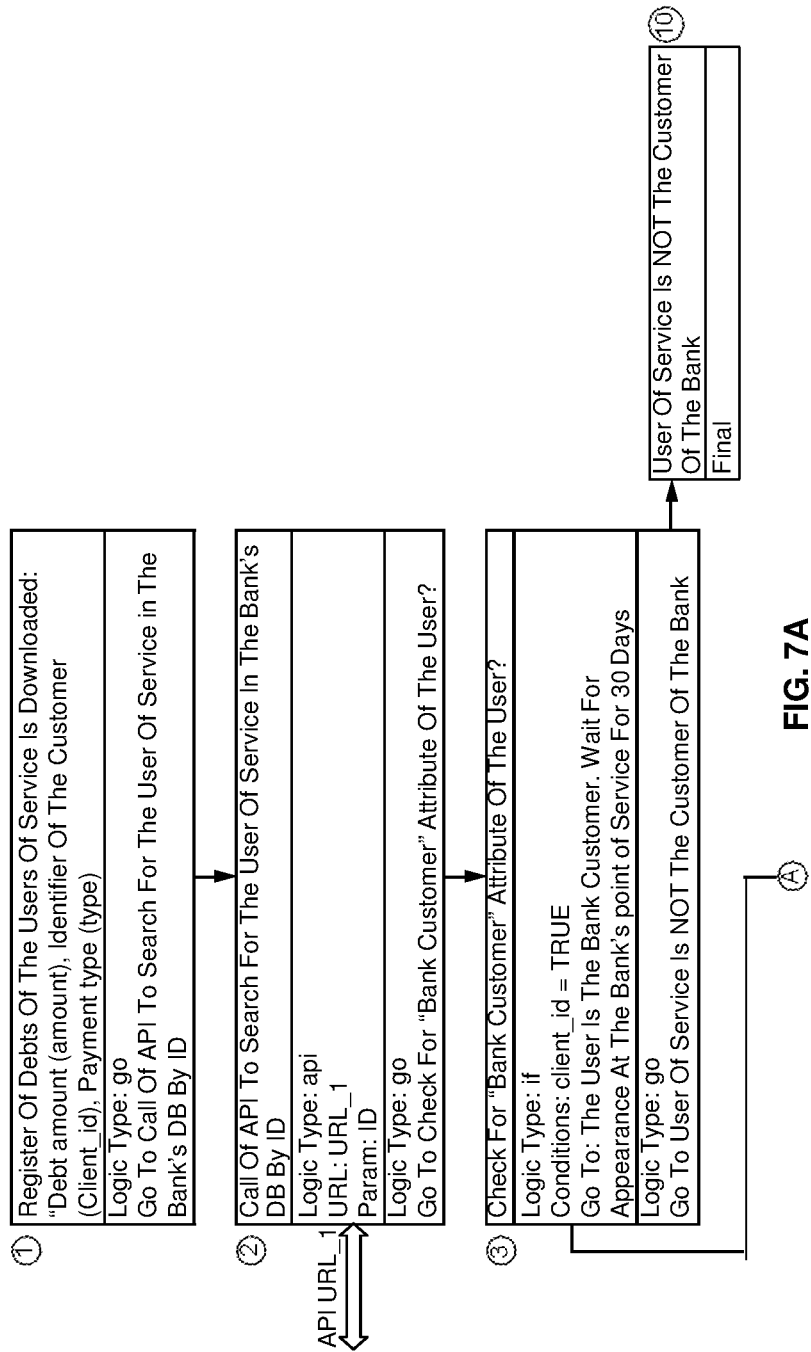
FIG. 7A, FIG. 7B, FIG. 7C method flow chart illustrates invoice payment process diagram schematically with layout of the Universal Computing Element system automated steps, which allow solving the task set in the example by creating the finite-state automaton with two states according to the algorithm stated above, according to one or more aspect of the present invention.
Figure 7B:
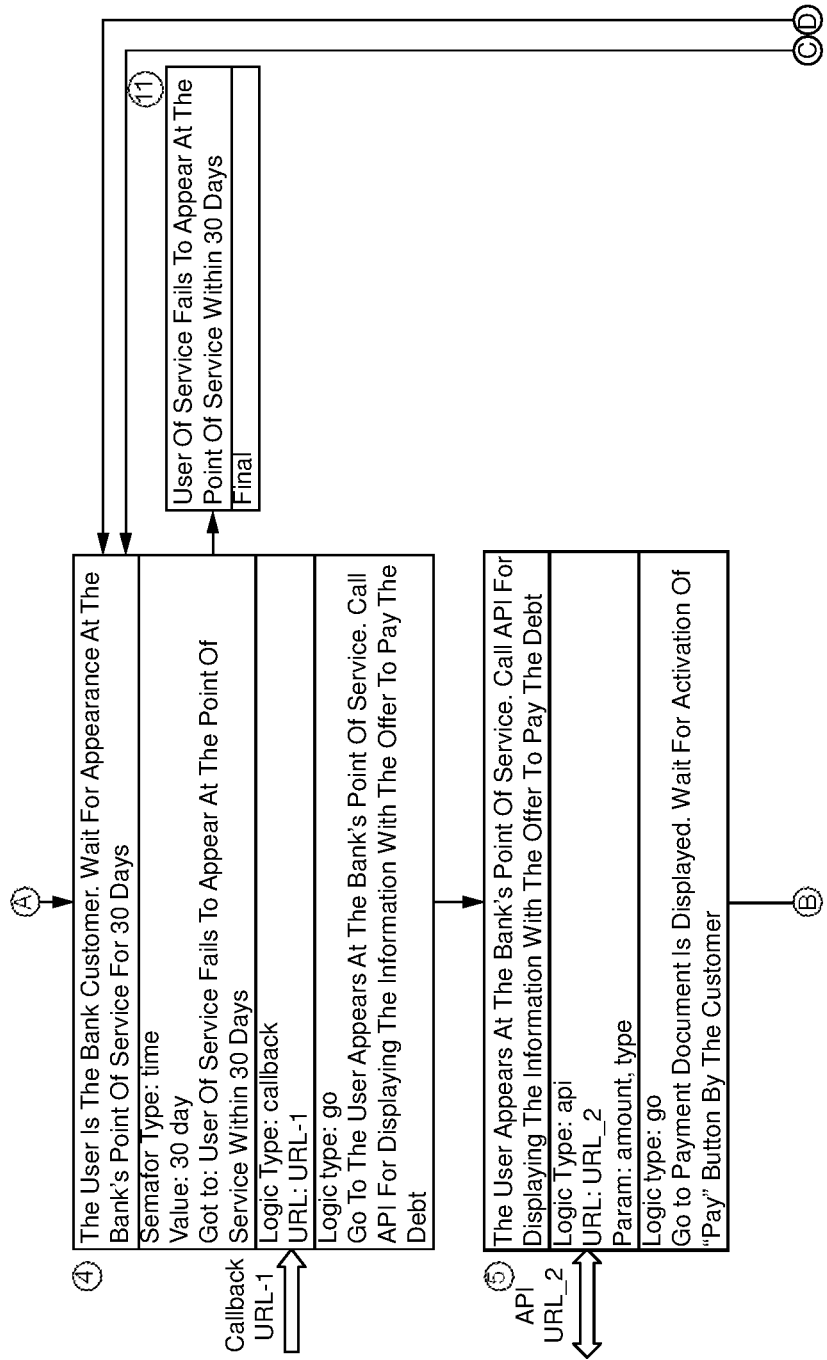
Figure 7C:
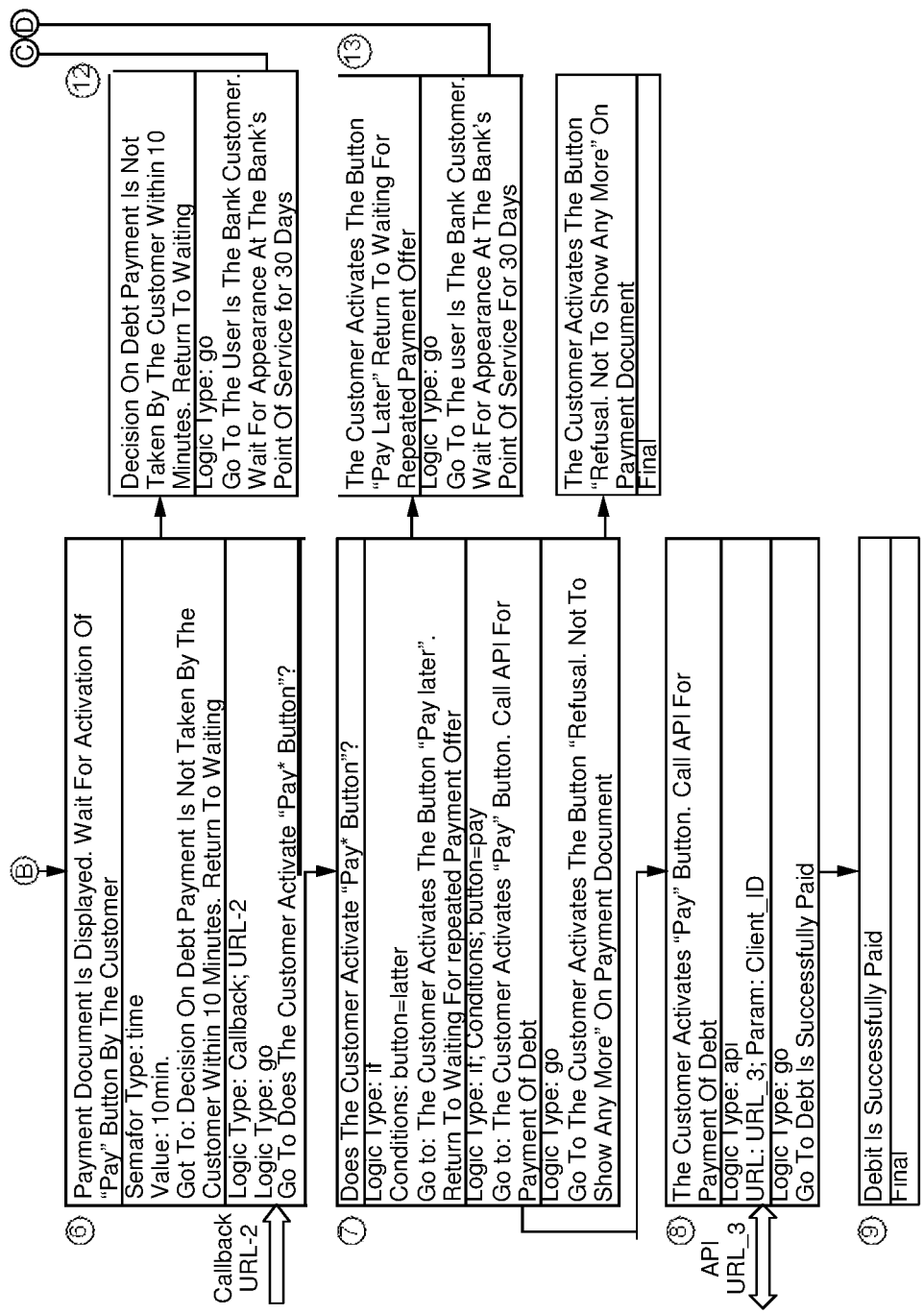

FIG. 6 illustrates invoice-payment algorithm of one method flow chart automated steps of solving task set in an example by creating finite-state automaton with two states. FIG. 7A-FIG. 7C is a method flow chart illustrates invoice payment process diagram schematically with layout of the Universal Computing Element system automated steps, which allow solving the task set in the example by creating the finite-state automaton with two states according to the algorithm stated above. As shown, bidirectional arrows define bidirectional data communication between created system of Universal Computing Elements with external systems by means of API application programs. According to working protocol, one or more data models contained in request (e.g., type, Client_id, amount) sent from the system, and in response data on results of processing (e.g., customer or not, what button is pressed by the customer in the interface, etc.) is received. Moreover, as shown, unidirectional arrow defines unidirectional data communication between created system of Universal Computing Elements with external systems and/or other processes, assembled of Universal Computing Elements, for example, by using CallBack function. According to protocol of CallBack function, for example, request "hangs up" in Universal Computing Element, and waits for update from external system or other process.

Figure 8:
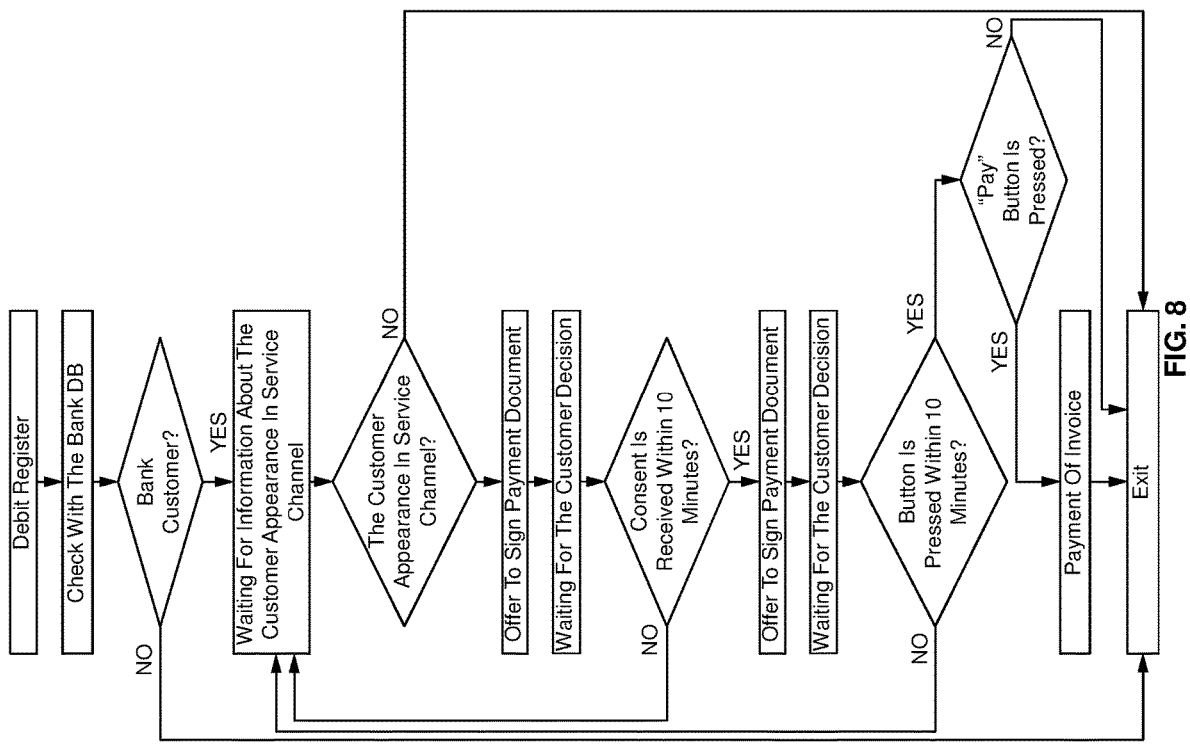
FIG. 8 illustrates invoice payment process algorithm flow chart of one method of automated steps solving the task set in the example by creating the finite-state automaton with three states, according to one or more aspect of the present invention.
Figure 9A:
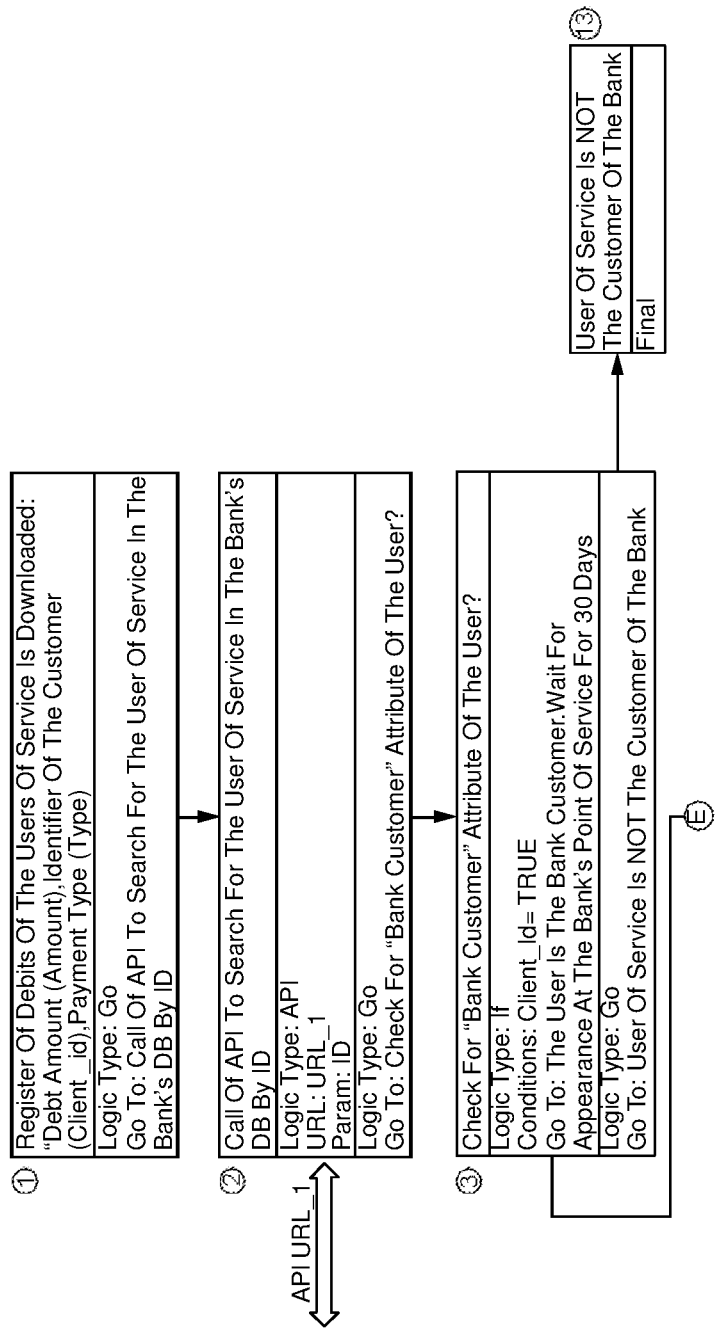
FIG. 9A, FIG. 9B, FIG. 9C, FIG. 9D illustrates schematically method flow chart layout of Universal Computing Element system automated steps, which allows solving the task set in the example by creating the finite-state automaton with three states according to the algorithm stated above, according to one or more aspect of the present invention.
Figure 9B:
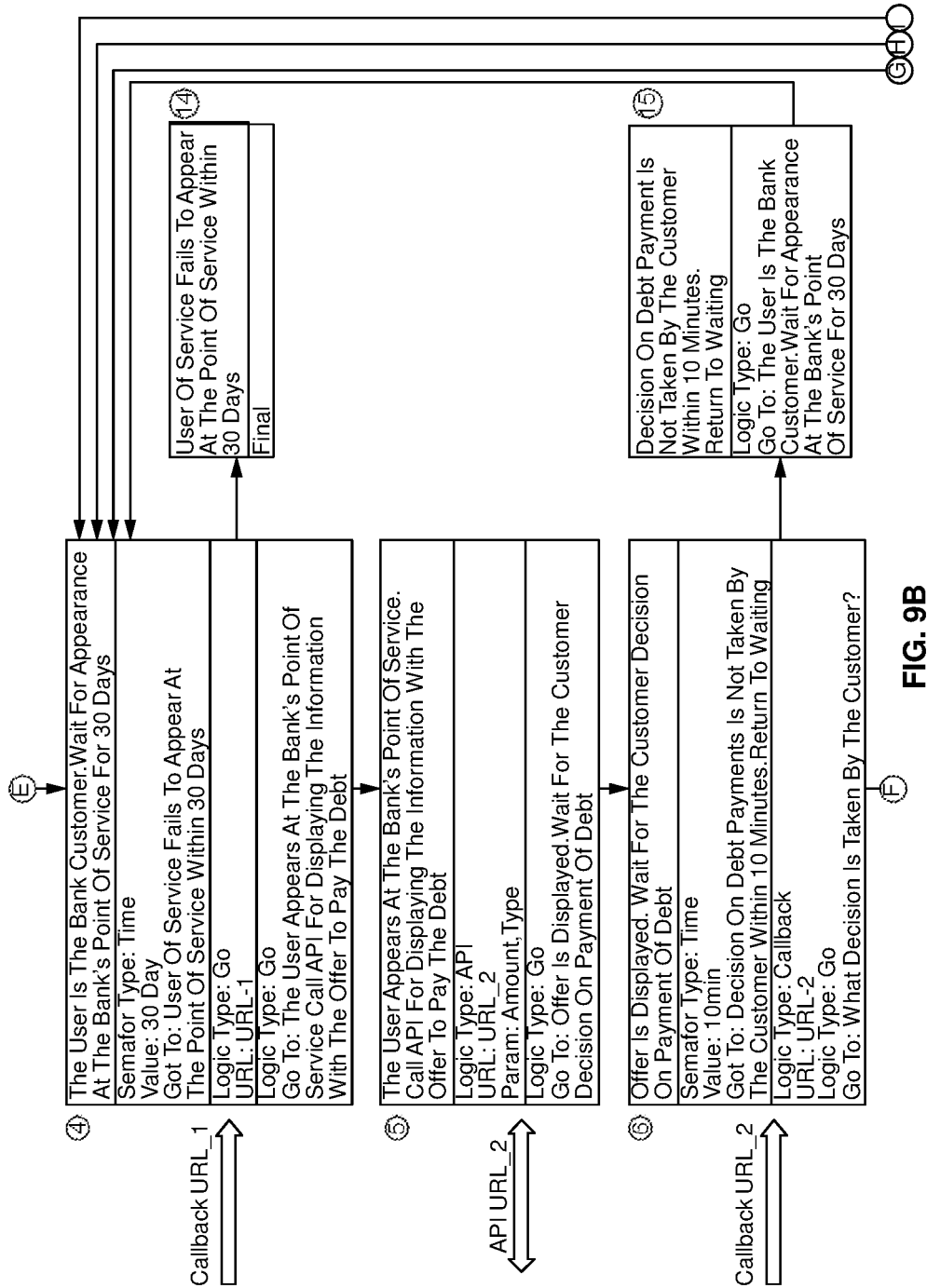
Figure 9C:
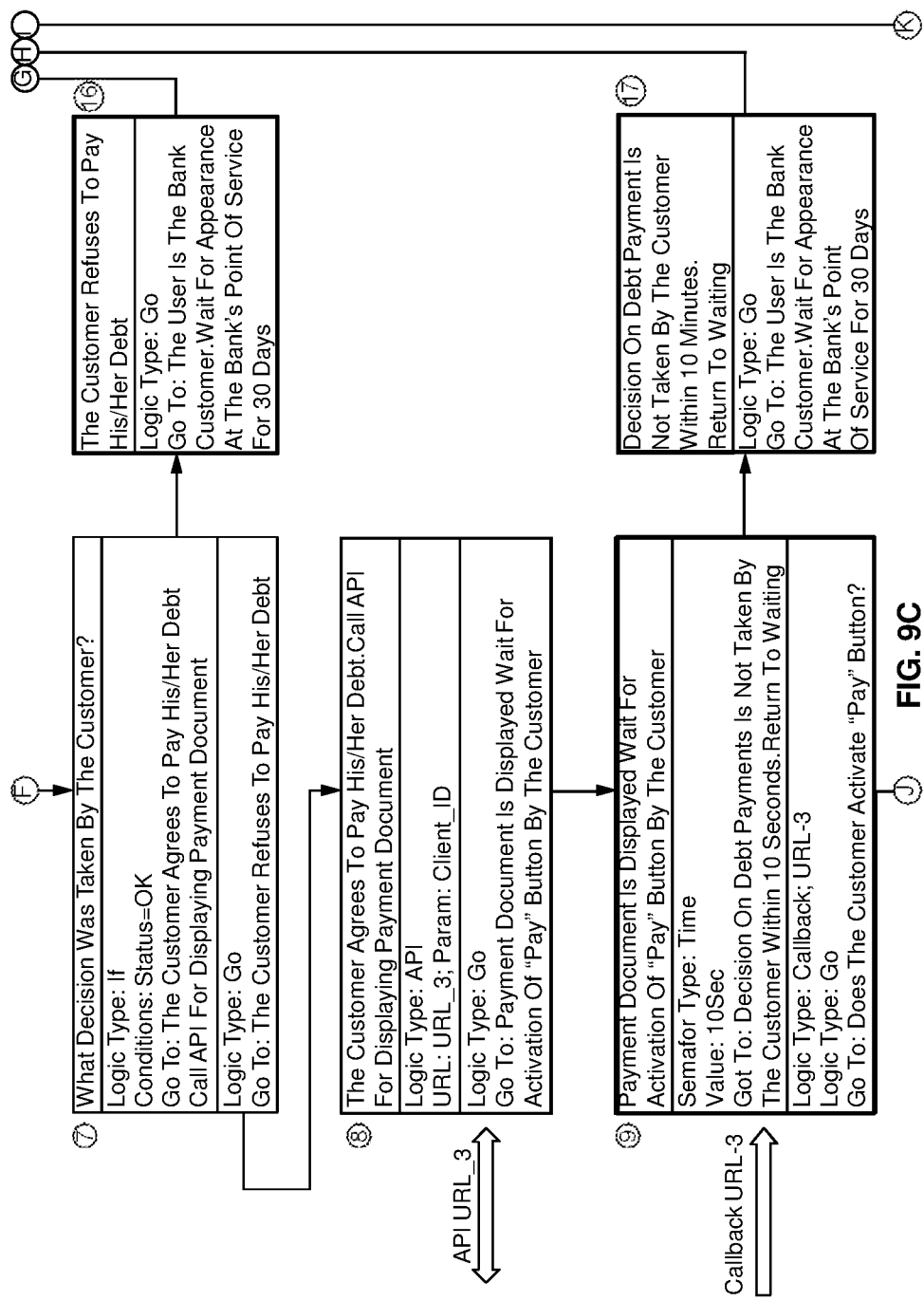
Figure 9D:
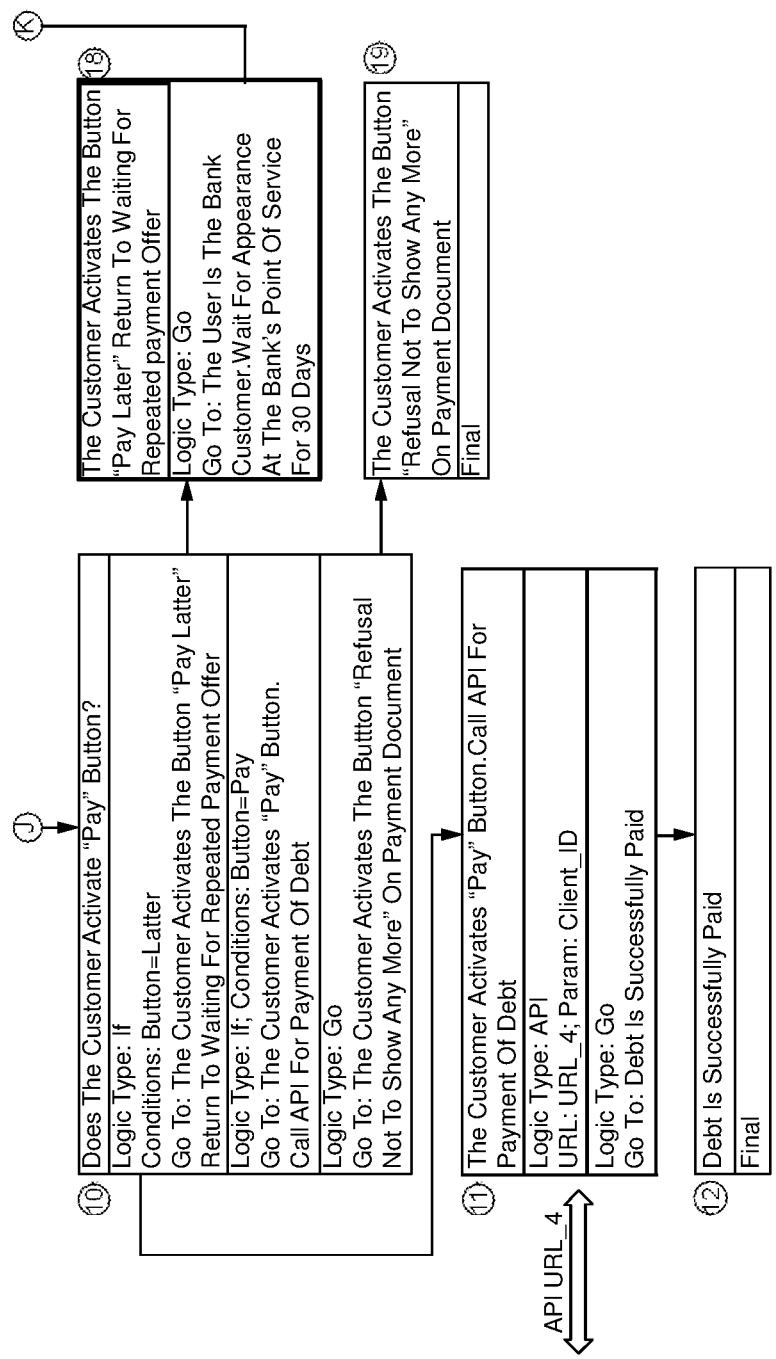

FIG. 8 illustrates invoice payment process algorithm flow chart of one method of automated steps solving the task set in the example by creating the finite-state automaton with three states. FIG. 9A-FIG. 9D illustrates schematically method flow chart layout of Universal Computing Element system automated steps, which allows solving the task set in the example by creating the finite-state automaton with three states according to the algorithm stated above.

In one embodiment, the system and method enabling computer programming and software development using Universal Computing Element (UCE) and various computing modes is disclosed as follows. It is contemplated generally herein that computer-implemented systems/methods enable computer programming and software development using Universal Computing Element (UCE) whereby computing modes use UCE's, such that software, computer program, source/object/assembly code, firmware or other reconfigurable logic or signal processing instructions include at least one UCE. For example, UCE-configured software programs or functionally equivalent reconfigurable hardware may be implemented programmably in general-purpose cloud operating system function according to related or unrelated algorithms, as well as for one and/or more owners, whereby such software runs on server or cloud, (private, public, or hybrid,) and/or hardware via firmware, micro-circuit, board, or equivalent functional logic.

Figure 10:
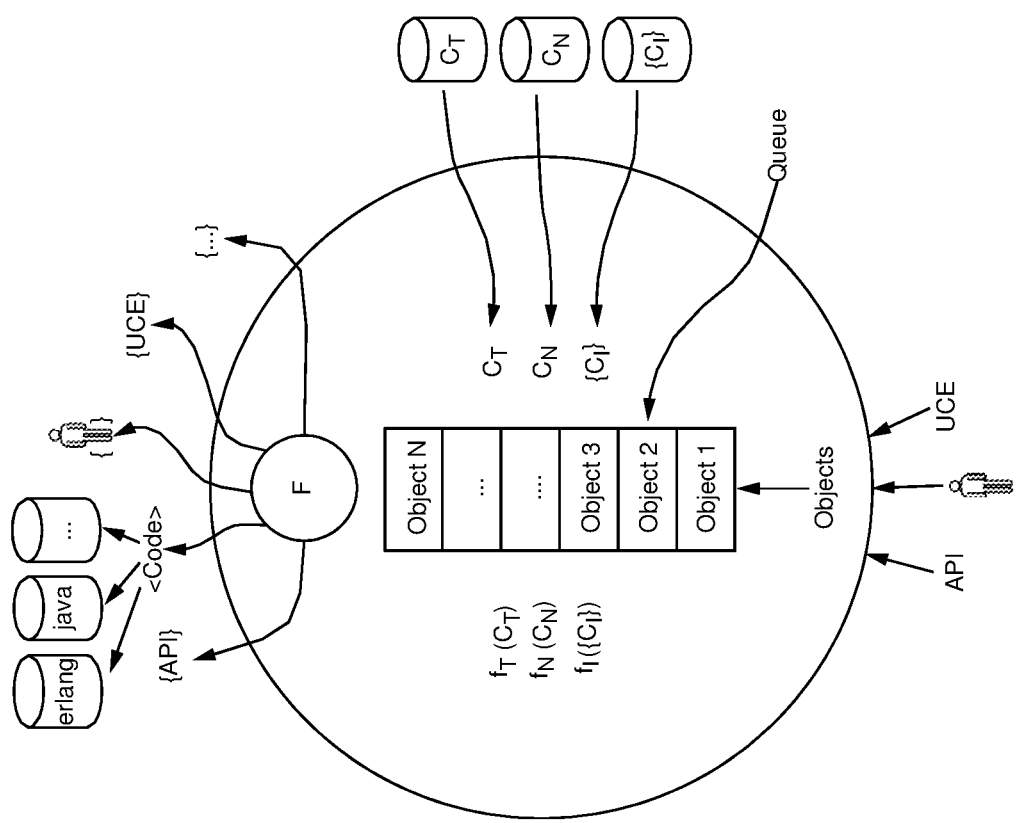
FIG. 10 illustrates representative apparatus diagram for embodying general scheme of main unit elements according to one or more aspect of the present invention.

FIG. 10 illustrates representative apparatus diagram for embodying general scheme of main unit elements. Preferably, main unit comprises Universal Computing Elements (UCE), including queue, semaphores, counters, system semaphore T, system semaphore N, as shown in FIG. 10. As understood herein characteristically, queue pertains to queue of objects in the unit, thereby accepted for computational processing in software, hardware, and/or integrated co-design combination. Semaphores pertain to system and user semaphores, such that when certain values are reached, semaphore triggers parallel process of escalation. Counters pertain to system and user counters, such that counter shows value only, without action; note that this characteristic is how counters differ from semaphores. System semaphore T pertains to specified time of object staying in unit, and system semaphore N pertains to specified number of objects that can be queued in unit.

Other data models pertain to data models specifiable for objects queued in the unit. Functions pertain to actions to be performed on the object from the queue in the unit; functions can be in the form of API, software code, other process etc. Thus, it is contemplated that when specified values of semaphores and/or functions are violated (e.g., exceeded,) escalation may be automatically triggered or otherwise arranged with use of process.

Referring further to representative computational system in FIG. 10 as implemented preferably using one or more programmable processor, network-accessible controller, or other computational finite state machine having accessible digital processing facility, storage, and user/network interface(s), "f" pertains to call of function-relevant UCE (i). "F" pertains to function to be realized through operator, API, code, or other UCE being assigned to each unit. "CT" pertains to counter, time T of oldest object in queue. "CN" pertains to number of objects in queue. "{Ci}" pertains to custom counters. "Queue" pertains to FIFO/LIFO queue or objects as inserted/removed by events.

Optionally to optimize performance of large, distributed systems, it may be advantageous to run counters synchronously or asynchronously on separate servers across a network. Generally it is contemplated herein that one or more computational operations are programmable implemented in one or more software application such as source/object/micro-code/firmware, as well as reconfigure-able hardware such as field programmable gate array, programmable logic device, and other configurable electronic logic circuitry, preferably controlled according to one or more processor/server/controller or equivalent construct with network access to one or more other such control construct and any digital memory/electronic memory/storage.

In accordance with one or more embodiment, improved computer programming and software development system and/or automated method uses UCE adaptively in modifiable computing modes, whereupon software, computer program, source/object/assembly code, firmware or other reconfigurable logic or signal processing instructions include at least one UCE, such that UCE-configured software programs may be implemented in general-purpose cloud or network operating system function according to related or unrelated algorithms, as well as for one and/or more owners, whereby UCE-implemented software runs on server or cloud, (private, public, or hybrid,) and/or hardware via firmware, micro-circuit, board, or equivalent functional logic.

Preferably, a representative universal computing element (UCE) unit comprises at least one queue, counter, function from counter (e.g., semaphore) and function applied to queued objects. When computationally defined or otherwise operating, information about one or more object may be automatically transferred to unit queue input (e.g., object identifier—Oi.)

Furthermore, one or more queue is configured and/or described by one or more standard semaphores and/or counters (e.g., semaphore of time/quantity.) Also, one or more rules and/or data models, data on the object may be processed in the unit, whereby one or more function is applicable to the one or more object. Such application of function to the object may have one or more pre-defined limitations on time and/or quantity.

Moreover, the function can be realized through programmable means such as API, code, process, operator, etc. After successful processing object data, the unit may deliver result for further processing. Upon any deviations from normal operation of the unit (e.g., processing time exceeded; more objects in queue waiting for processing, etc.,) the unit may trigger escalation (e.g., escalation algorithm may include other UCE units). Escalation data models and conditions can be extended based on needs of certain algorithm(s.)

Figure 11:
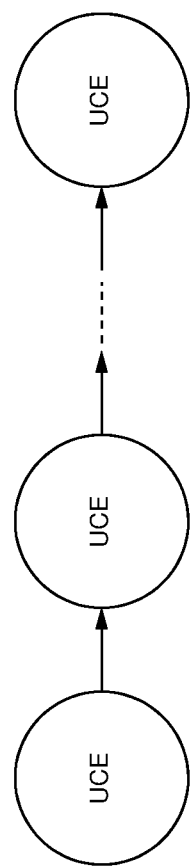
FIG. 11 illustrates schematic representation of variants of unit connection according to one or more aspect of the present invention.

FIG. 11 illustrates schematic representation of variants of multiple UCE unit connection, as possibly coupled in serial and/or parallel network, array and/or subnetwork. Algorithm/process/program can be implemented with the use of the sequence/set/array of UCE, as shown configured in sample implementation of FIG. 2. As understood herein, a process comprises an assembly of units.

Figure 12:
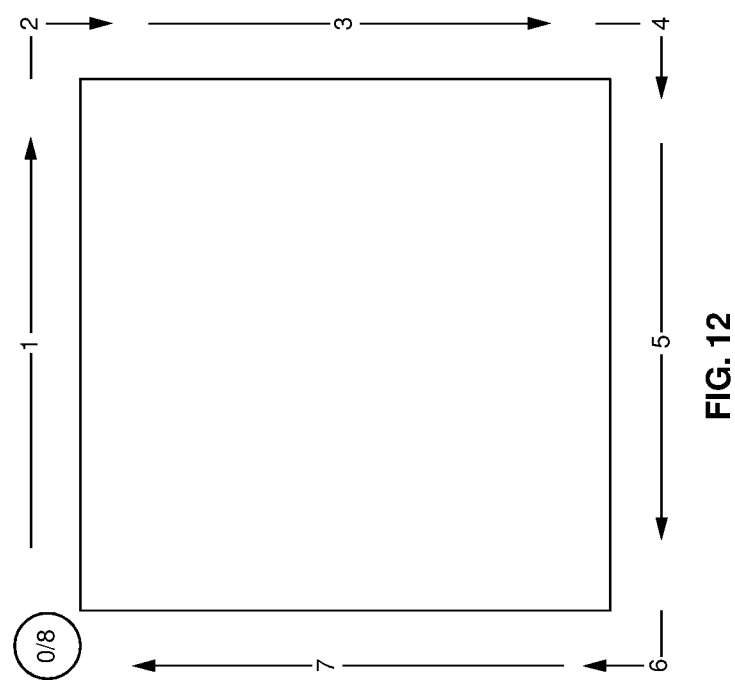
FIG. 12 illustrates schematic representation of robot motion trajectory (Example 1) according to one or more aspect of the present invention.

FIG. 12 illustrates schematic representation of Example 1 for robot motion trajectory, particularly implementing automated control of robot vacuum cleaner motion algorithm. Illustrated task organizes robot vacuum cleaner motion computationally along square-shaped trajectory, as shown configured in sample implementation of FIG. 12.

Figure 13:
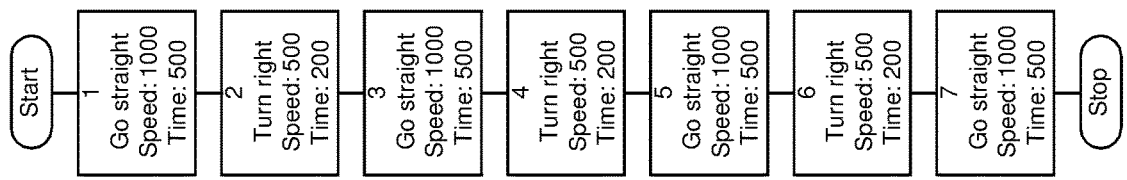
FIG. 13 illustrates motion process control flowchart of Example 1 according to one or more aspect of the present invention.

FIG. 13 illustrates motion process control flowchart of Example 1, including various instructions (e.g., go straight, turn right, etc.) with corresponding speed and time values.

Figure 14:
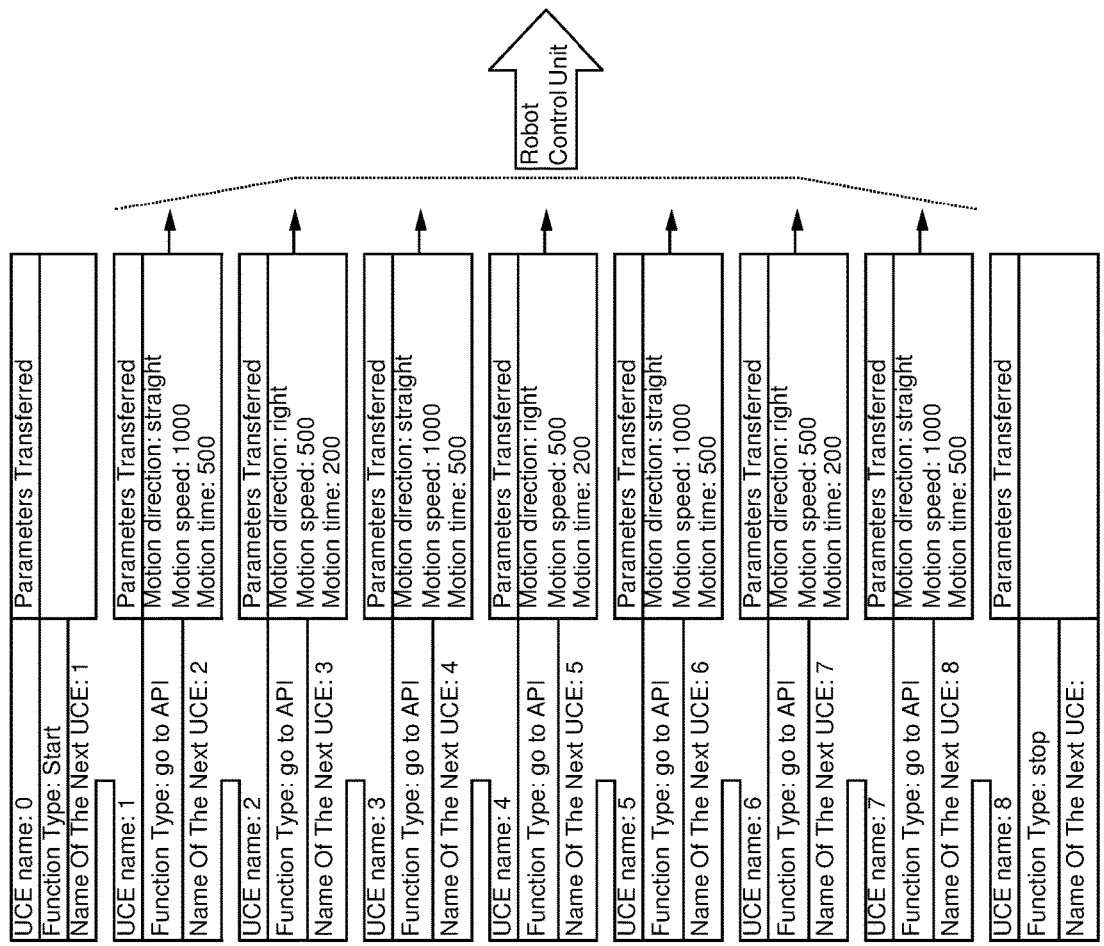
FIG. 14 illustrates organization of computation process using UCE of Example 1 according to one or more aspect of the present invention.

FIG. 14 illustrates organization of computation process using UCE of Example 1. As shown, several programmable settings, e.g., UCE names, data models transfer, function type, and name of next UCE, etc., are configured for robot control automatically according to such UCE settings.

Figure 15:
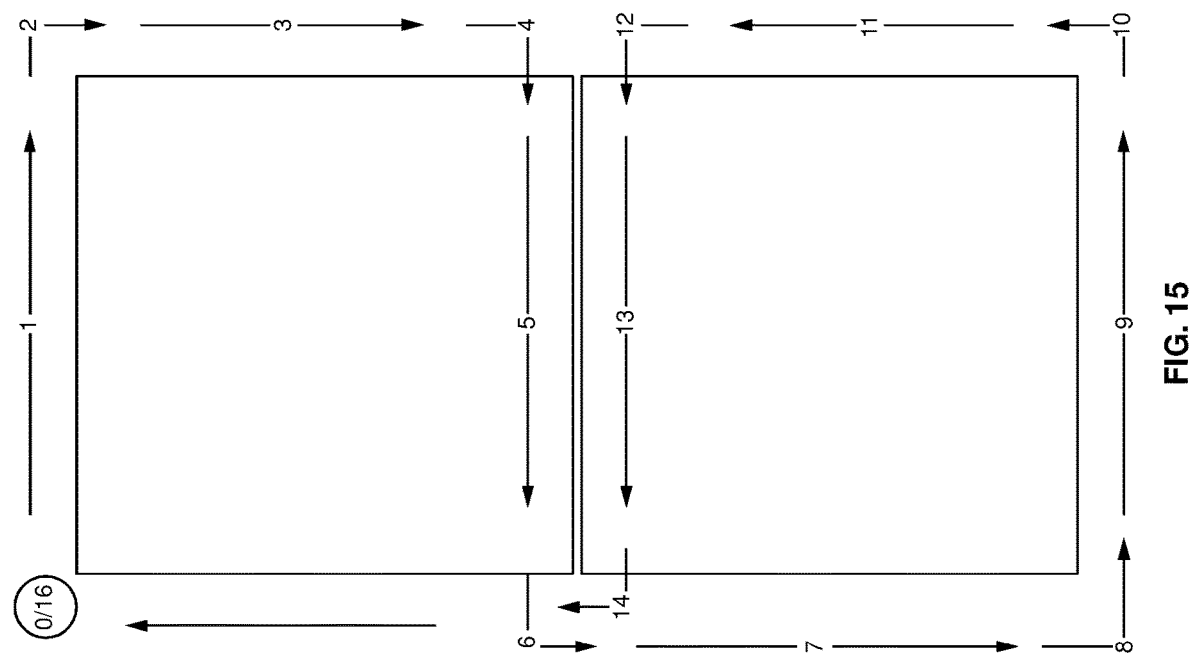
FIG. 15 illustrates schematic representation of robot motion trajectory (Example 2) according to one or more aspect of the present invention.

FIG. 15 illustrates schematic representation of another Example 2 for robot motion trajectory that controls robot vacuum cleaner motion algorithm, which organizes robot vacuum cleaner motion along figure-of-eight trajectory, as shown configured in sample implementation of FIG. 15.

Figure 16:
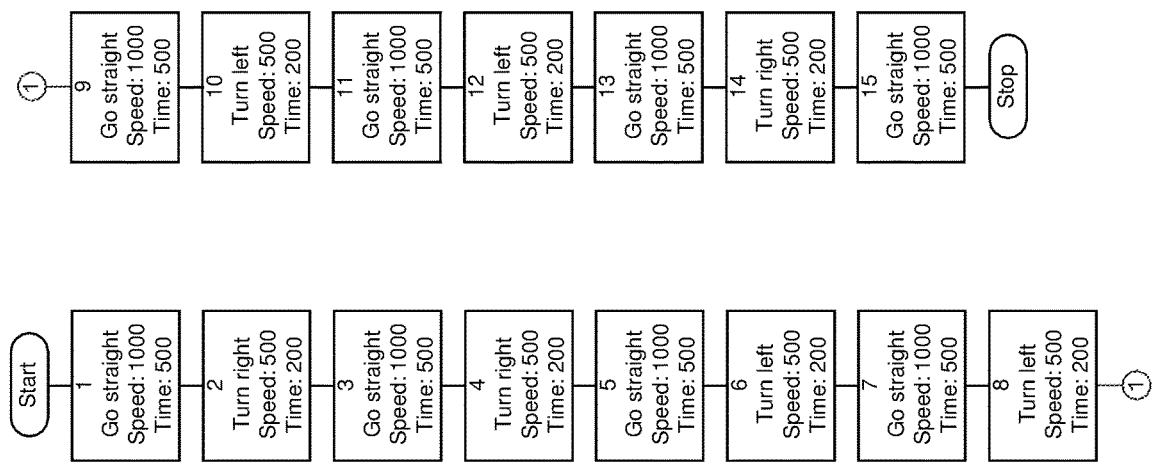
FIG. 16 illustrates motion process control flowchart of Example 2 according to one or more aspect of the present invention.

FIG. 16 illustrates motion process control flowchart of Example 2, including various instructions (e.g., go straight, turn right, turn left, etc.) with corresponding speed and time values.

Figure 17A:
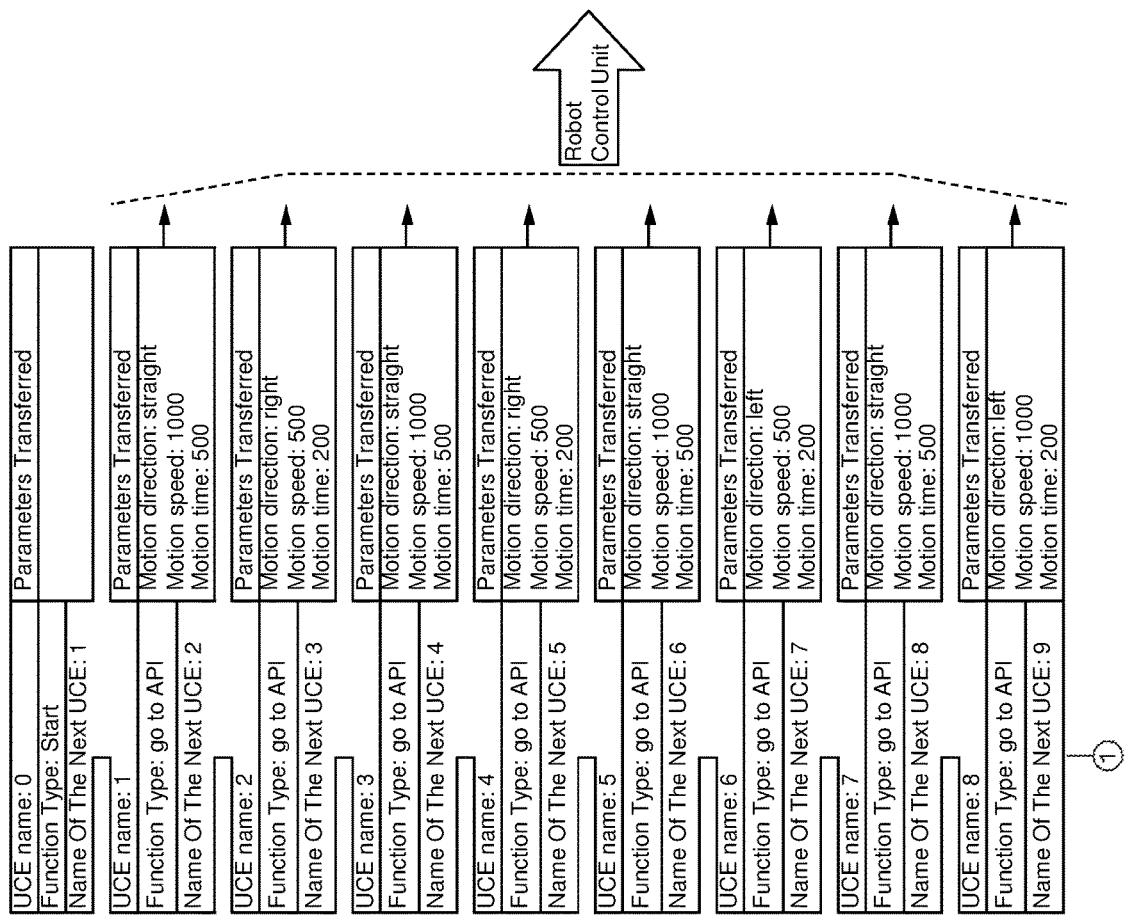
FIG. 17A, FIG. 17B illustrate organization of computation process using UCE of Example 2 according to one or more aspect of the present invention.
Figure 17B:
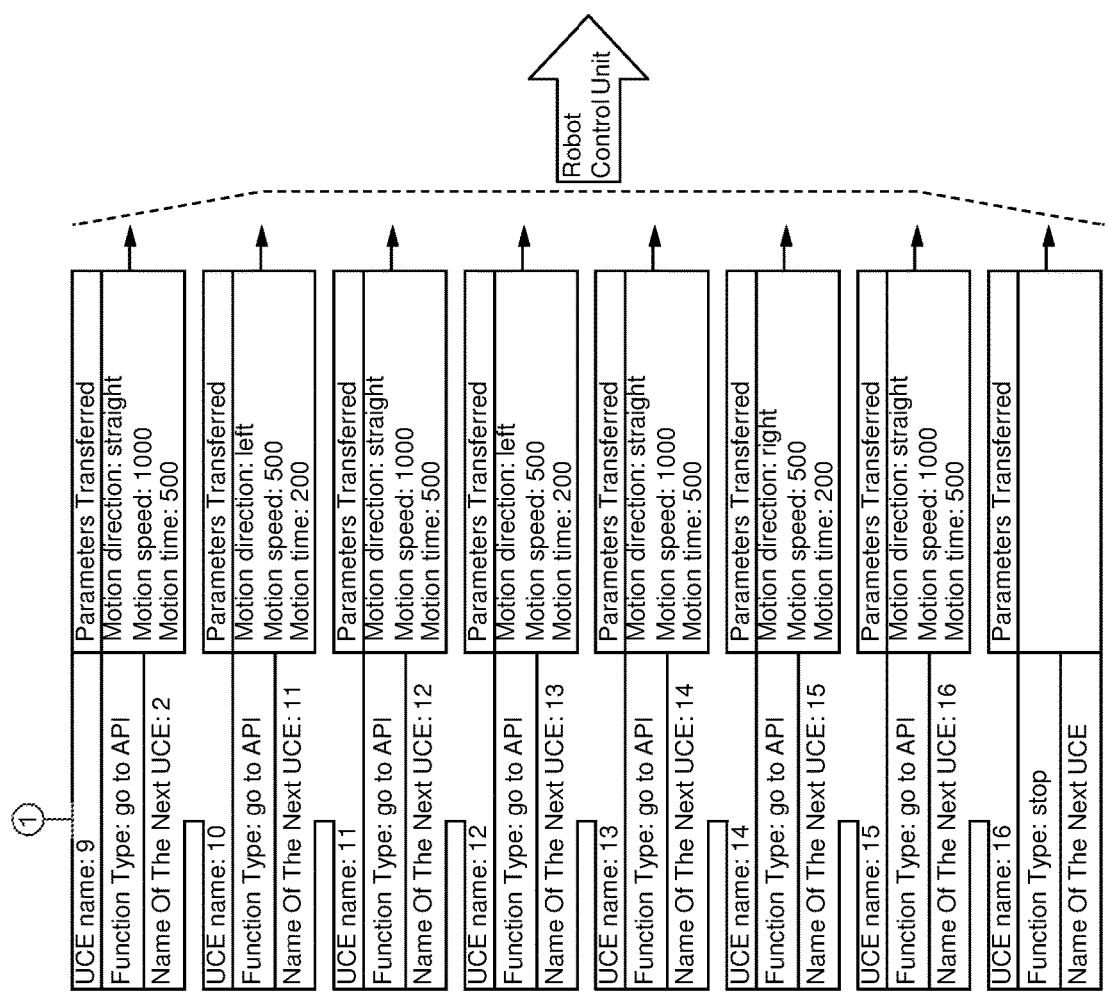

FIG. 17A-FIG. 17B illustrate organization of computation process using UCE of Example 2. As shown, several programmable settings, e.g., UCE names, data models transfer, function type, and name of next UCE, etc., are configured for robot control automatically according to such UCE settings. Note that Example 2 represents more complex variant than the task of Example 1. Yet in comparison of the offered variants to solve tasks using UCE, changing of computational algorithm from FIG. 13 to FIG. 16 advantageously does not require additional programming, because simple changes are relatively easy by using and/or modifying previously used UCE's.

Figure 18:
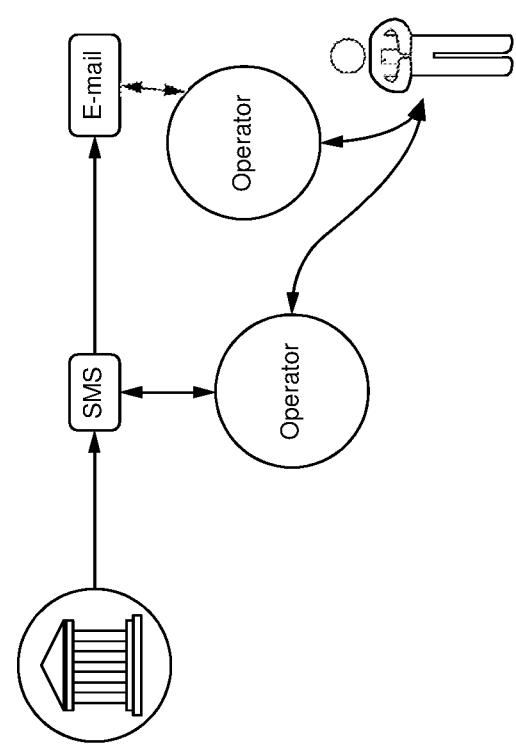
FIG. 18 illustrates schematic representation of organization of delivery of short text message from company to customer (Example 3) according to one or more aspect of the present invention.

FIG. 18 illustrates schematic representation of organization of delivery of short text and/or email message from company to customer, as Example 3. Accordingly, delivery of short text and/or email message from the company to the customer is organized as shown in FIG. 18, such that control of process of short text and/or email message enables automated sending to a customer with established priority of the message delivery channel, preferably whereby method for sending a message is SMS messaging; but if the message cannot be sent, it may be delivered in e-mail message format.

Figure 19:
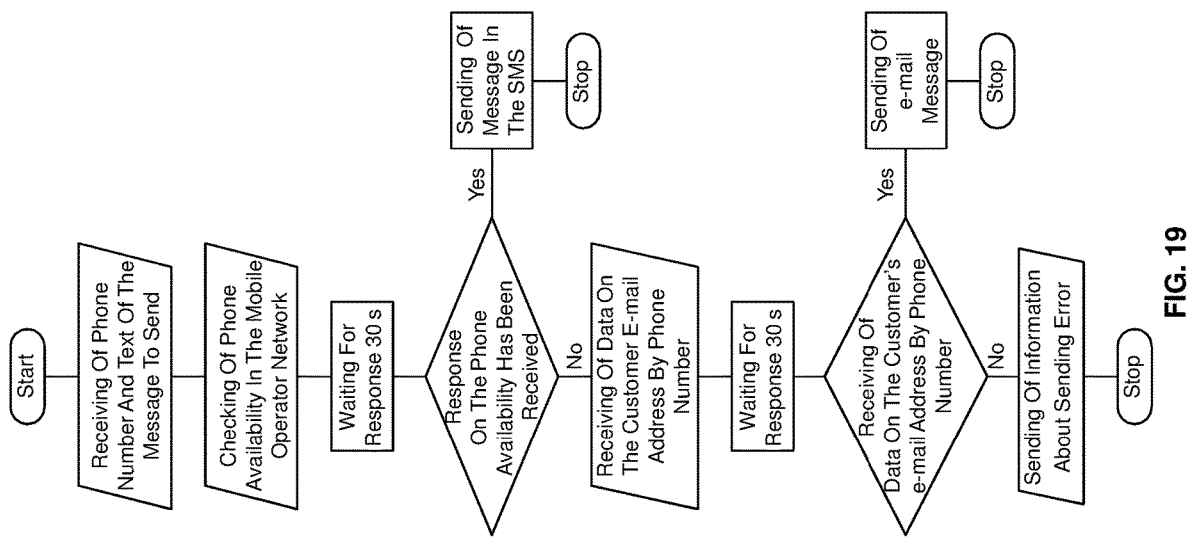
FIG. 19 illustrates message sending process control flowchart of Example 3 according to one or more aspect of the present invention.

FIG. 19 illustrates message sending process control flowchart of Example 3, including various instructions (e.g., receiving, checking, waiting, responding, sending, etc.)

Figure 20A:
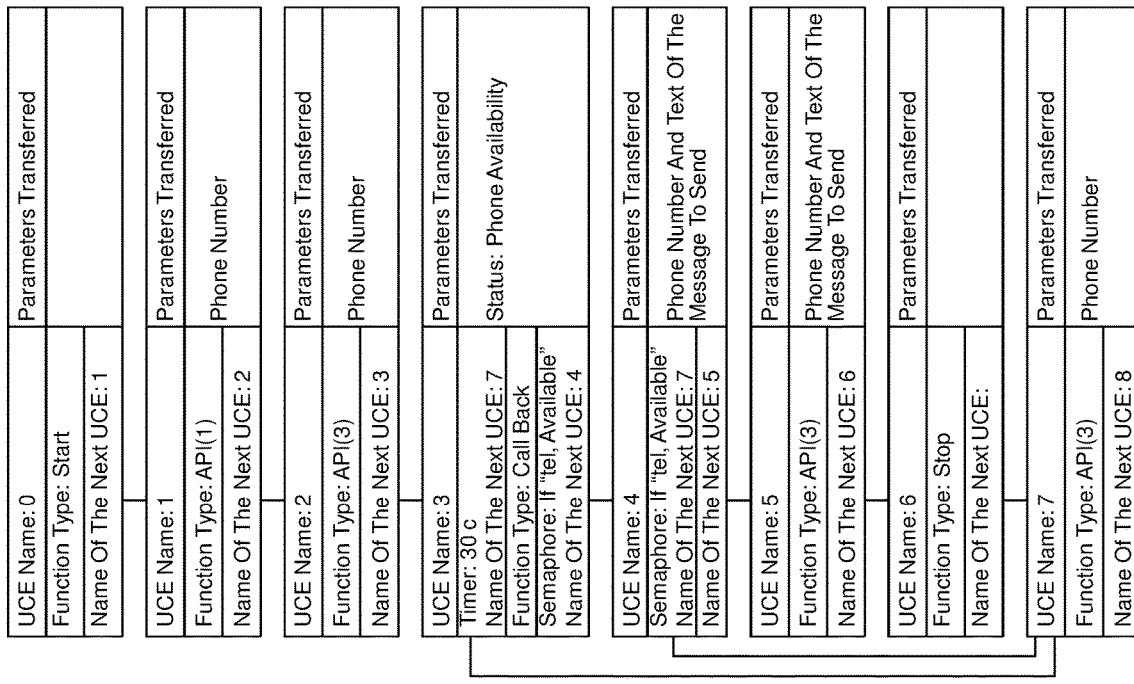
FIG. 20A, FIG. 20B illustrate organization of computation process using UCE of Example 3 according to one or more aspect of the present invention.
Figure 20B:
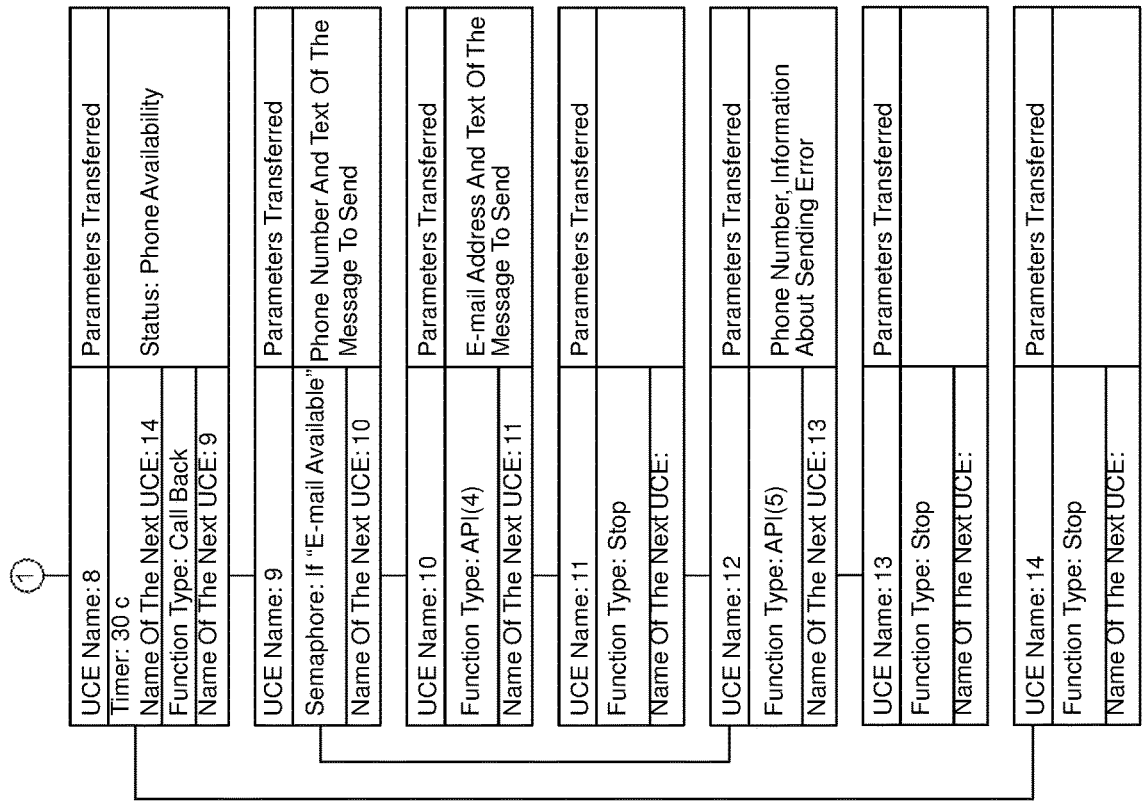

FIG. 20A-FIG. 20B illustrate organization of computation process using UCE of Example 3. As shown, several programmable settings, e.g., UCE names, data models transfer, function type, and name of next UCE, etc., are configured for messaging control automatically according to such UCE settings.

Figure 21:
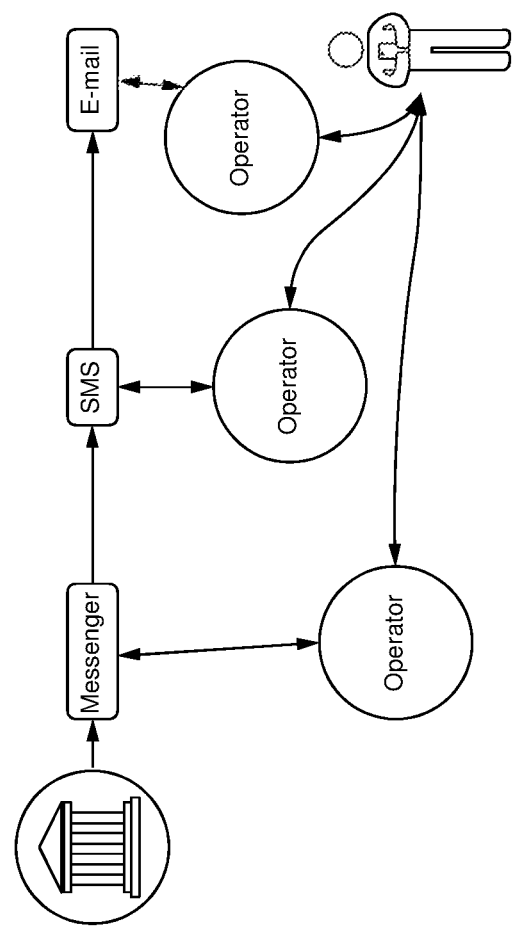
FIG. 21 illustrates schematic representation of organization of delivery of short text message from company to customer (Example 4) according to one or more aspect of the present invention.

FIG. 21 illustrates schematic representation of organization of delivery of short text message from company to customer, as Example 4. Accordingly, delivery of short text message from the company to the customer is organized as shown in FIG. 21, such that control of process of short text message enables automated sending to a customer with established priority of the message delivery channel, preferably whereby method for sending a message is messaging with the use of messenger and/or e-mail program; but if the message cannot be sent, it may be delivered in SMS, messenger and/or e-mail message format.

Figure 22A:
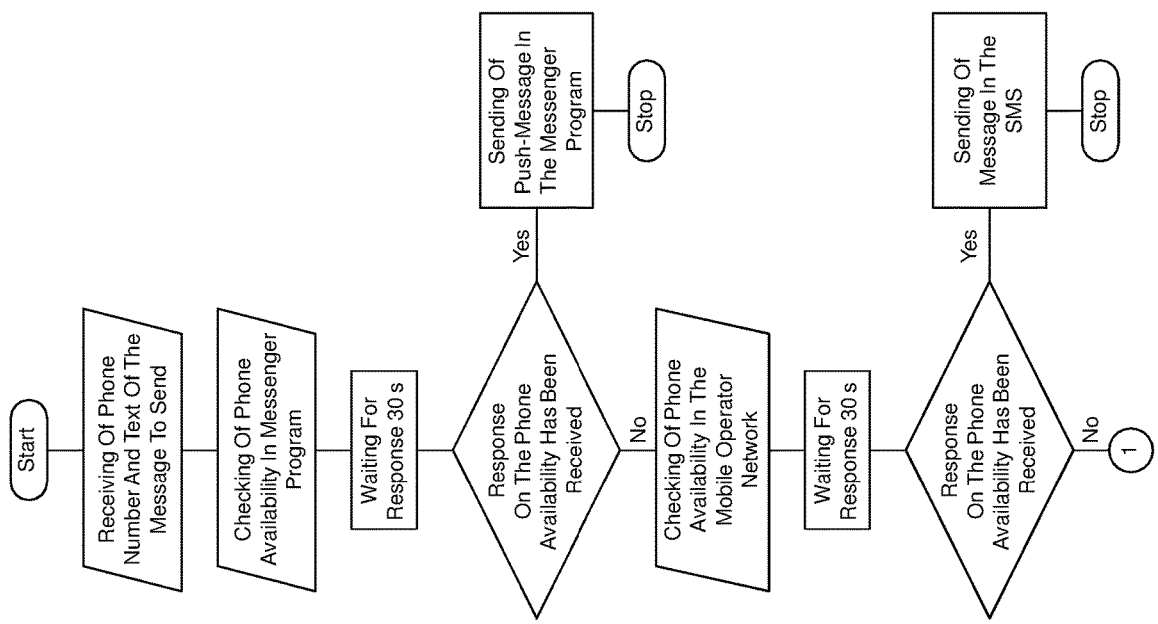
FIG. 22A, FIG. 22B illustrate message sending process control flowchart of Example 4 according to one or more aspect of the present invention.
Figure 22B:
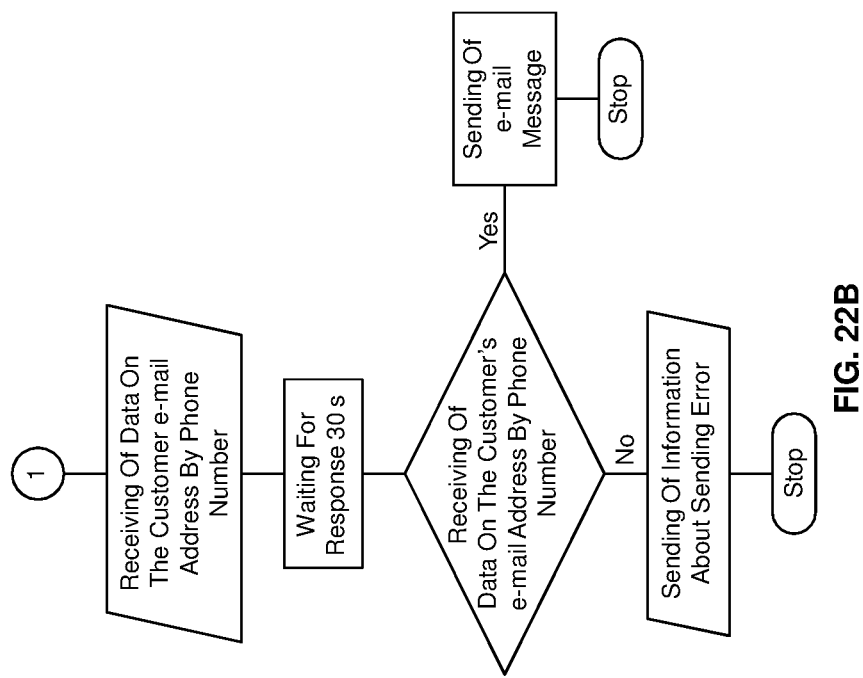

FIG. 22A-FIG. 22B illustrate message sending process control flowchart of Example 4, including various instructions (e.g., receiving, checking, waiting, responding, sending, etc.)

Figure 23A:
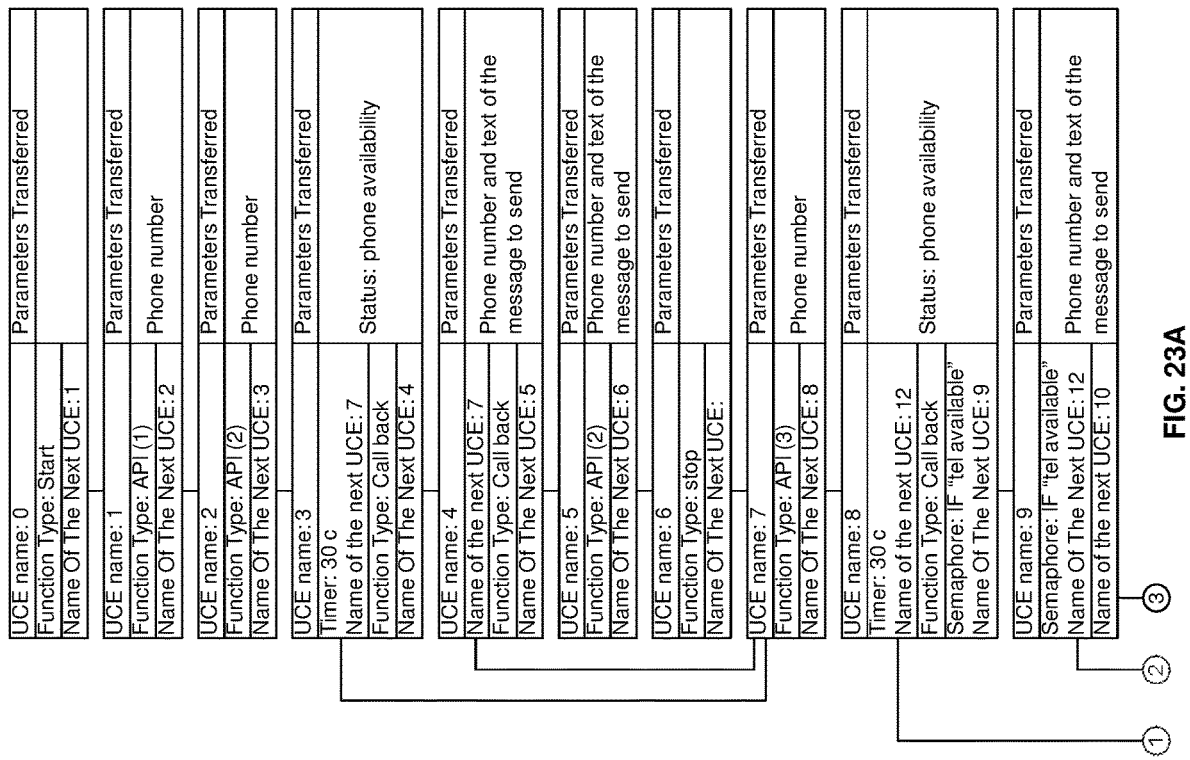
FIG. 23A, FIG. 23B illustrate organization of computation process using UCE of Example 4 according to one or more aspect of the present invention.
Figure 23B:
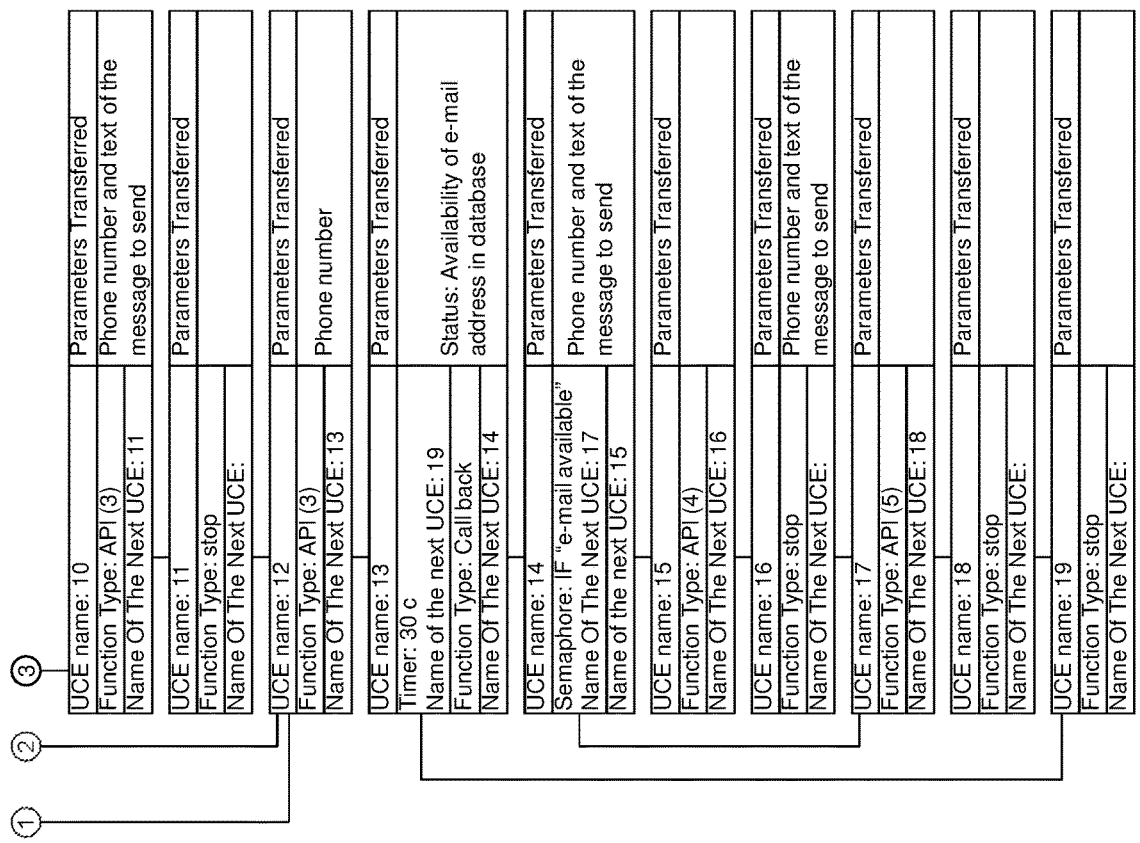

FIG. 23A-FIG. 23B illustrate organization of computation process using UCE of Example 4. As shown, several programmable settings, e.g., UCE names, data models transfer, function type, and name of next UCE, etc., are configured for messaging control automatically according to such UCE settings. Note that Example 4 represents more complex variant than the tasks of previous Examples. Yet in comparison of the offered variants to solve tasks using UCE, changing of computational algorithm from FIG. 19 to FIG. 22B advantageously does not require additional programming, because simple changes are relatively easy by using and/or modifying previously used UCE's. Operationally, this computational algorithm enables automatically sending messages to customers structurally by configuring loading at process start of list of customer phone numbers. UCE counters may record information regarding operations performed in each algorithm branch, thereby reliably confirming upon completion of list processing various attributes or conditions, for example, the number of messages, by which channel and to what customers has been sent, and to whom the messages were not sent since no communication channel was available, etc.

Figure 24:
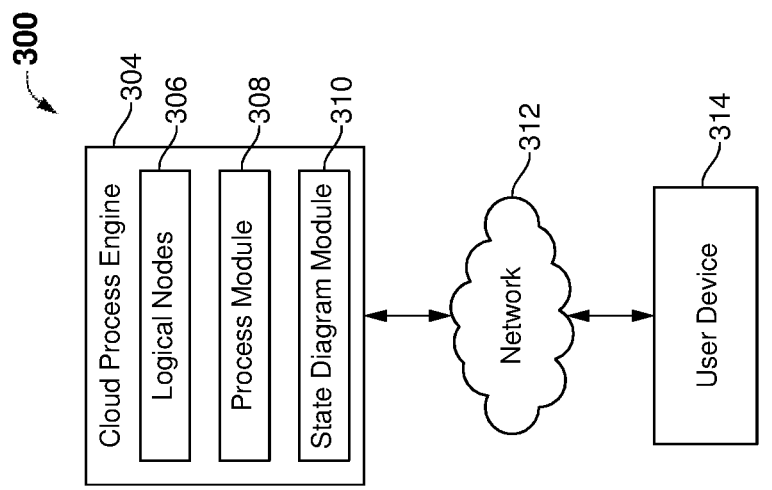
FIG. 24 illustrates an environment implemented according to one or more aspect of the present invention.

FIG. 24 illustrates an environment 300 implemented according to one or more aspect of the present invention. The environment 300 comprises a cloud process engine 304 and a user device 314. The cloud process engine 304 comprises one or more logical nodes 306, a process module 308, and a state diagram module 310. The logical nodes 306 comprises at least one universal computing element. The user device 314 associated with a user is configured to access the cloud process engine 304 via the network 312. In an embodiment, the network 312 is at least anyone of a Wi-Fi network, WiMax network, and wireless local area network. In one embodiment, the user device 314 is at least anyone of a desktop, a laptop, a tablet, a mobile phone, mobile and/or handheld electronic devices, personnel digital assistants, smart phones, smart televisions, palm tops and phablets.

The cloud process engine 304 enables the user to describe companies or business as set of finite states or process. The user is enabled to access at least one of a process module 308 or a state diagram module 310. The process module 308 is configured to enable process creation. The process module 308 provides access to the full set of logics and limits the number of tasks in the process. The state diagram module 310 enables create state diagram. The state diagram module 310 provides a limited logic set and does not have limit for the number of tasks.

The user device 314 enables the user to input, at the cloud process engine 304 via the process module 308, one or more data to create a process. In one embodiment, the input data could be a process title and description of the process. The created process comprises a start node and an end node are displayed to the user. The user device 314 enables the user to drag and drop one or more logical nodes 306 at the start node to build the process. Advantageously, the present invention enables to build processes simply by combining logical blocks using 'drag & drop' option. The user device 314 enables the user input at the cloud process engine 304 via the state diagram module 310, one or more data to create one or more finite states.

Figure 25:
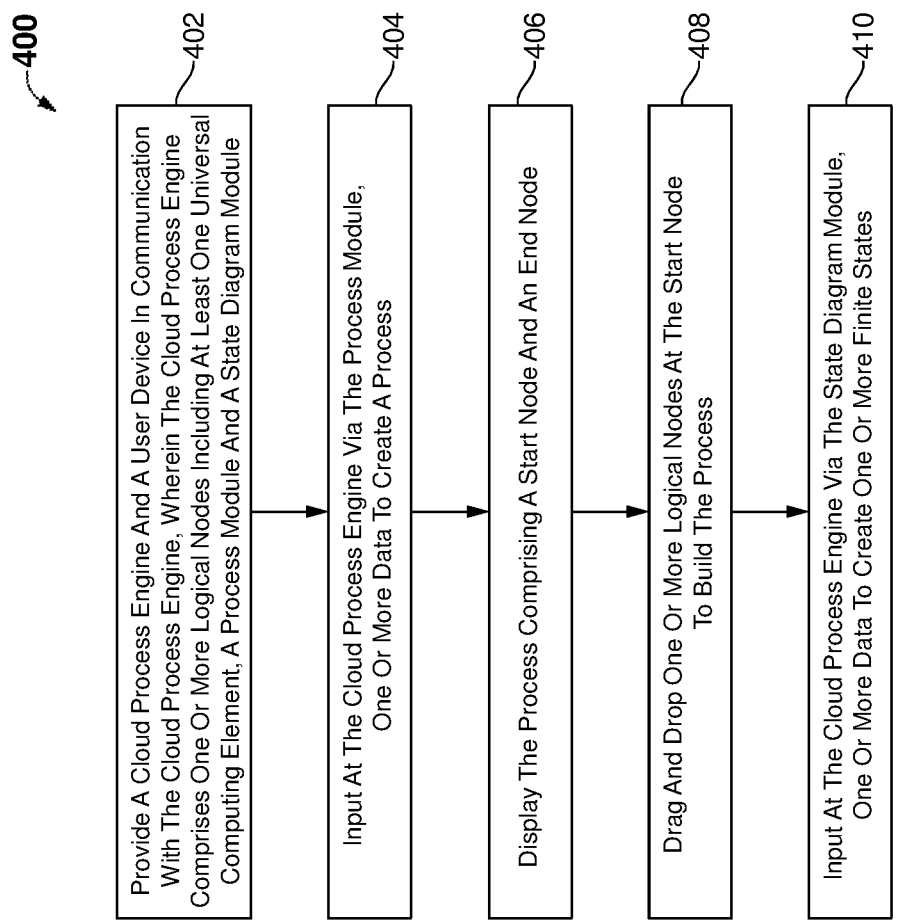
FIG. 25 illustrates a flowchart of a method for binding and constructing data and process electronically using universal computing element according to one or more aspect of the present invention.

FIG. 25 illustrates a flowchart of a method 400 for binding and constructing data and process electronically using universal computing element according to one or more aspect of the present invention. The method 400 comprises a step 402 of: providing a cloud process engine and a user device in communication with the cloud process engine, wherein the cloud process engine comprises one or more logical nodes including at least one universal computing elements, a process module configured to enable process creation and a state diagram module configured to enable state diagram creation. The method 400 further comprises a step 404 of: inputting at the cloud process engine via the process module, one or more data to create a process. The method 400 further comprises a step 406 of: displaying the process comprising a start node and an end node. The method 400 further comprises a step 408 of: dragging and dropping one or more logical nodes at the start node to build the process. The method 400 further comprises a step 410 of: inputting at the cloud process engine via the state diagram module, one or more data to create one or more finite states.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for automating a data processing flow, said system comprising:
   a Universal Computing Element (UCE), wherein the UCE comprises:
      a queue of objects, wherein each object within the queue of objects comprises one or more data models, wherein the one or more data models characterize an object according to a rule for an object function to be applied, the object function comprising an action to be performed on the object within the queue of objects,
      at least one counter configured to dynamically represent a status of objects within the queue of objects, and
      a counter function configured to manage execution of the object function based on the at least one counter; and
   a processor coupled to a memory element storing executable instructions and said processor executing instructions to configure the system to:
      enable a dragging and dropping of one or more UCEs and a connection of the one or more UCEs to implement a first automated workflow process,
      wherein the first automated workflow process is defined by a first plurality of UCEs, comprised of the one or more UCEs connected as a first set of nodes in the first automated workflow process,
      wherein a first UCE within the first plurality of UCEs defining the first automated workflow process is configurable to:
         perform at least one application programming interface (API) call associated with an external service,
         trigger an operation of the first UCE within a second plurality of UCEs defining a second automated workflow process, the second automated workflow process being defined by the second plurality of UCEs connected as a second set nodes in the second automated workflow process,
         receive data from at least one of the following:
            the second plurality of UCEs associated with the second automated workflow process,
            the external service to which an API call was made,
         perform an operation on at least one object within the queue of objects based on the received data,
         derive a resultant data based, at least in part, on the operation performed based on the received data,
         transmit, to a second UCE within the first plurality of UCEs, at least one of the following: the data, and the resultant data, wherein transmitted data is used, at least in part, to determine a state of behavior of the second UCE within the first plurality of UCEs, and
         transmit, to the second UCE within the second plurality of UCEs, at least one of the following: the data, and the resultant data, wherein transmitted data is used, at least in part, to determine the state of behavior of the second UCE within the second plurality of UCEs.

2. The system of claim 1, wherein the processor is configured to receive the data through at least one API.

3. The system of claim 1, wherein the data is transformed into a finite set of states by the second automated workflow comprising the second plurality of UCEs before being received by a processor.

4. The system of claim 3, wherein the second automated workflow is hosted on the external service.

5. The system of claim 1, wherein the processor is further configured to host a third automated workflow in a waiting mode, wherein the waiting mode allows for the processor to instantly process the data according to the third automated workflow upon receiving the data from the external service.

6. The system of claim 1, wherein the data is transformed into a first queue of objects according to one or more types of data models.

7. The system of claim 1, further comprising a diagram, wherein the diagram is comprised of the one or more UCEs as connected nodes, wherein a configuration of the diagram dictates the implementation of the first automated workflow process.

8. The system of claim 1, wherein the processor is further configured to return the resultant data to the external service, and wherein the resultant data is returned to the external service through an API.

9. The system of claim 1, wherein the status of objects within the queue of objects is an amount of time that the object within the queue of objects has existed within the queue of objects.

10. The system of claim 1, wherein the status of objects within the queue of objects is a number of objects within the queue of objects.

11. The system of claim 1, further comprising:
   a first counter configured to dynamically represent a number of objects within the queue of objects;

a second counter configured to dynamically represent an amount of time that the object within the queue of objects has existed within the queue of objects; and wherein the counter function is configured to manage the execution of the object function based on the first counter and the second counter.

12. The system of claim 1, wherein the status of objects within the queue of objects is a number of times the object function has been executed while the object within the queue of objects has existed within the queue of objects.

13. The system of claim 1, wherein the counter function halts execution of the object function in response to the at least one counter exceeding a threshold value.

14. The system of claim 1, wherein the counter function prompts execution of the object function in response to the at least one counter exceeding a threshold value.

15. The system of claim 1, wherein the counter function prompts execution of the object function in response to the at least one counter falling below a threshold value.

16. The system of claim 1, wherein the execution of the object function using the one or more data models produces an output that is used as an input for another UCE.

17. The system of claim 1, wherein the counter function prompts activation of a subsequent UCE in response to the at least one counter exceeding a threshold value.

18. A method for processing data using universal computing elements, said method comprising:
providing an automata-based programming environment for a configuration of one or more universal computing elements (UCEs), wherein each universal computing element (UCE) comprises:
a queue of objects, wherein each object within the queue of objects comprises one or more data models, wherein the one or more data models characterize an object according to a rule for an object function to be applied,
said object function comprising an action to be performed on the object, wherein said action is realized through at least one of the following: an internal source of data, and through an API applied to an external source of data,
a counter configured to dynamically represent a status of objects within the queue of objects, and
a counter function managing execution of the object function based on the counter, wherein the counter function triggers escalation of a subsequent UCE for execution of the object function in response to at least one of the following: a time the object has been in queue without at least one of: said action and successful event, a number of objects in queue, and at least one object function being violated;
establishing a first automated process comprised of a first plurality of UCEs connected as a first set of nodes defining the first automated process, the first set of nodes being indicative of various states of operations associated with the first automated process;
establishing a second automated process comprised of a second plurality of UCEs connected as a second set of nodes defining the second automated process, the second set of nodes being indicative of various states of operations associated with the first automated process;
triggering an operation of a first UCE within the first plurality of UCEs defining the first automated process;
triggering, by the first UCE, the second automated process comprised of the second plurality of UCEs;

receiving data from at least one UCE from the second plurality of UCEs associated with the second automated process;
performing, by the first UCE, a function associated with the object and the received data to derive resultant data; and
transmitting, to a second UCE within the first plurality of UCEs, the resultant data, wherein transmitted data is used, at least in part, to determine a state of behavior of the second UCE within the first plurality of UCEs.

19. The method of claim 18, wherein the object within the queue of objects executed on by the object function is a first object within the queue of objects determined by a first in first out (FIFO) ordering structure.

20. The method of claim 18, wherein the object within the queue of objects executed on by the object function is a first object within the queue of objects determined by a last in first out (LIFO) ordering structure.

21. A system for binding and constructing processes electronically using universal computing elements (UCEs), comprising:
a processor configured to:
construct one or more UCEs into at least one automated workflow,
call a second workflow comprised of a second plurality of UCEs during an execution of a first workflow comprised of a first plurality of UCEs,
receive data from the second workflow into the first workflow, and
determine a state of the first workflow based on the data received from the second workflow,
wherein each universal computing element (UCE) comprises:
a queue of objects, wherein each object within the queue of objects comprises one or more data models, wherein the one or more data models characterize an object according to a rule for an object function to be applied,
said object function comprising an action to be performed on the object, wherein said action is realized through at least one of the following: an internal source of data, and through an API applied to an external source of data,
a counter configured to dynamically represent a status of objects within the queue of objects, and
a counter function to manage the execution of said object function based on the counter and wherein said counter function triggers recruitment of at least a second UCE upon an object function violation of a first UCE; and
a user device configured to access the processor, wherein the user device enables a user to:
input at the processor, one or more data to create a process, display the process comprising a start node and an end node, wherein each node corresponds to one UCE; and
drag and drop one or more logical nodes at the start node to build the process.

22. A method for automating a data processing flow, said method comprising dragging and dropping one or more UCE at a start node to implement automated processes with external service and call back logic, wherein the one or more UCE further comprises an object with an object function to be applied, wherein said object function comprising an action to be performed on the object;
establishing a first automated process comprised of a first plurality of UCEs connected as a first set of connected nodes defining the first automated process, the first set of connected nodes being indicative of various states of operations associated with the first automated process;

establishing a second automated process comprised of a second plurality of UCEs connected as a second set of nodes defining the second automated process, the second set of nodes being indicative of various states of operations associated with the first automated process;

triggering an operation of a first UCE within the first plurality of UCEs defining the first automated process;

triggering, by the first UCE, the second automated process comprised of the second plurality of UCEs;

receiving data from at least one UCE from the second plurality of UCEs associated with the second automated process;

performing, by the first UCE, a function associated with the object and the received data to derive resultant data; and transmitting, to a second UCE within the first plurality of UCEs, the resultant data, wherein transmitted data is used, at least in part, to determine a state of behavior of the second UCE within the first plurality of UCEs.

* * * * *